United States Patent
Chen et al.

(10) Patent No.: US 11,800,416 B2
(45) Date of Patent: Oct. 24, 2023

(54) WIRELESS COMMUNICATION METHOD AND APPARATUS

(71) Applicant: HUAWEI TECHNOLOGIES CO., LTD., Guangdong (CN)

(72) Inventors: Chao Chen, Shanghai (CN); Li Hu, Shanghai (CN); Zhongli Zhang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 102 days.

(21) Appl. No.: 17/201,974

(22) Filed: Mar. 15, 2021

(65) Prior Publication Data
US 2021/0204181 A1 Jul. 1, 2021

Related U.S. Application Data

(63) Continuation of application No. PCT/CN2019/105801, filed on Sep. 12, 2019.

(30) Foreign Application Priority Data

Sep. 15, 2018 (CN) .......................... 201811077550.8

(51) Int. Cl.
*H04W 36/00* (2009.01)
*H04W 76/27* (2018.01)
(Continued)

(52) U.S. Cl.
CPC ..... *H04W 36/0079* (2018.08); *H04W 12/037* (2021.01); *H04W 12/041* (2021.01);
(Continued)

(58) Field of Classification Search
None
See application file for complete search history.

(56) References Cited

U.S. PATENT DOCUMENTS

2009/0111428 A1* 4/2009 Blommaert ......... H04W 12/041
455/445
2011/0274276 A1 11/2011 Xu
(Continued)

FOREIGN PATENT DOCUMENTS

| CN | 102281535 A | 12/2011 |
| CN | 103931219 A | 7/2014 |
| WO | 2017134312 A1 | 8/2017 |

OTHER PUBLICATIONS

HTC, Google Inc., "Security configuration in intra-system handover," 3GPP TSG-RAN2 Meeting NR Adhoc 1807, R2-1810701, Montreal, Canada, Jul. 2-6, 2018, 5 pages.
(Continued)

*Primary Examiner* — San Htun
(74) *Attorney, Agent, or Firm* — Fish & Richardson P.C.

(57) ABSTRACT

Example wireless communication methods and apparatus are described. One example method includes a terminal initiates a reestablishment procedure when a handover procedure of the terminal fails. When a base station reselected by the terminal is a base station (that is, a target base station) to which the terminal is handed over in a handover procedure, and because a key of the base station is updated in the handover procedure, the base station includes key derivation information in a reestablishment message to be sent to the terminal. Therefore, the terminal can update a key of the terminal based on the key derivation information, so that the key of the terminal can be consistent with the key of the base station.

9 Claims, 9 Drawing Sheets

(51) Int. Cl.
  *H04W 12/041* (2021.01)
  *H04W 12/037* (2021.01)
  *H04W 36/32* (2009.01)

(52) U.S. Cl.
  CPC ....... *H04W 36/0038* (2013.01); *H04W 36/32* (2013.01); *H04W 76/27* (2018.02)

(56) References Cited

U.S. PATENT DOCUMENTS

| | | | | |
|---|---|---|---|---|
| 2012/0039472 | A1* | 2/2012 | Liu | H04W 12/041 380/270 |
| 2012/0129499 | A1* | 5/2012 | Li | H04L 63/068 455/411 |
| 2013/0083726 | A1* | 4/2013 | Jain | H04W 4/70 370/328 |
| 2013/0183974 | A1* | 7/2013 | Johansson | H04W 36/08 455/436 |
| 2016/0366175 | A1* | 12/2016 | Basu Mallick | H04L 63/1416 |
| 2019/0159025 | A1* | 5/2019 | Ben Henda | H04W 36/14 |

OTHER PUBLICATIONS

Huawei, HiSilicon, "Discussion on error and key handling on UE for Reestablishment Procedure in case of N2 handover failure," 3GPP TSG-RAN WG2#104, R2-1817842, Spokane, USA, Nov. 12-16, 2018, 9 pages.

Office Action in Chinese Application No. 201811077550.8, dated Sep. 3, 2020, 17 pages.

PCT International Search Report and Written Opinion in International Application No. PCT/CN2019/105801, dated Nov. 27, 2019, 34 pages.

3GPP TS 33.401 V15.4.0 (Jun. 2018), "3rd Generation Partnership Project; Technical Specification Group Services and System Aspects; 3GPP System Architecture Evolution (SAE); Security architecture (Release 15)," Jun. 2018, 162 pages.

3GPP TS 33.501 V15.1.0 (Jun. 2018), "3rd Generation Partnership Project; Technical Specification Group Services and System Aspects; Security architecture and procedures for 5G system(Release 15)," Jun. 2018, 152 pages.

Extended European Search Report issued in European Application No. 19859832.8 dated Oct. 27, 2021, 15 pages.

Huawei, Hisilicon, "Discussion on Key Handling on Reestablishment Procedure in case of N2 handover failure," 3GPP TSG SA WG (Security) Meeting #95, S3-191395, 9 pages, May 6-10, 2019.

Huawei, Hisilicon, "RRC Reestablishment security handling in case of N2 Handover failure," 3GPP TSG SA WG3 (Security) Meeting #95, S3-191394, Reno, USA, May 6-10, 2019, 3 pages.

ZTE Corporation, Sanechips, "Reestablishment security framework," 3GPP TSG-RAN WG2 Meeting#103, R2-1811487, Gothenburg, Sweden Aug. 20-24, 2018, 6 pages.

CATT, "Discussion on Key Refresh," 33GPP TSG-RAN WG2 #103, R2-1811805, Gothenburg, Sweden, Aug. 20-24, 2018, 5 pages.

Ericsson, "Discussion on NAS Container for intra-and inter-system handover," 3GPP TSG-RAN WG2#AH1807 ,Tdoc R2-1810770, Montreal, Canada, Jul. 2-6, 2018, total 5 pages.

Office Action issued in Chinese Application No. 201811077550.8 dated Apr. 6, 2021, 15 pages (with English translation).

Qualcomm Incorporated, "Clarifications to: Security handling in mobility," 3GPP TSG-SA WG3 Meeting #91Bis, S3-181979, La Jolla, USA, May 21-25, 2018, 10 pages.

\* cited by examiner

WIRELESS COMMUNICATION METHOD AND APPARATUS

CROSS-REFERENCE TO RELATED APPLICATIONS

This application is a continuation of International Application No. PCT/CN2019/105801, filed on Sep. 12, 2019, which claims priority to Chinese Patent Application No. 201811077550.8, filed on Sep. 15, 2018. The disclosures of the aforementioned applications are hereby incorporated by reference in their entireties.

TECHNICAL FIELD

This application relates to the field of mobile communications technologies, and in particular, to a wireless communication method and an apparatus.

BACKGROUND

In 5th generation (5G) communications, due to reasons such as movement of a terminal, the terminal needs to initiate a handover (HO) procedure, that is, the terminal needs to be handed over from a source base station to a target base station. When a handover occurs, the terminal may need to initiate a reestablishment procedure due to some reasons such as a handover failure or a reconfiguration failure.

When the terminal initiates reestablishment in the target base station in the handover procedure, due to a plurality of reasons, for example, a key on a core network has been updated in the handover procedure, an algorithm on a core network side is reselected, or the key on the core network is not synchronized with a key on a base station side, a case in which a security context on the terminal is not consistent with a subsequent security context on a network side is caused subsequently.

SUMMARY

This application provides a wireless communication method and an apparatus, so that a key of a terminal is consistent with a key on a network side.

According to a first aspect, this application provides a wireless communication method, used in a scenario in which a handover of a terminal fails, including: The terminal sends a reestablishment request message to a base station, where the reestablishment request message is used to reestablish an RRC connection; the terminal receives a reestablishment message from the base station, where the reestablishment message includes a next hop chaining counter NCC and key derivation information; the terminal derives a first access stratum key of the terminal based on the key derivation information; the terminal derives a second access stratum key of the terminal based on the NCC and the first access stratum key of the terminal; and the terminal sends a reestablishment complete message to the base station, where the reestablishment complete message is protected by using a key derived based on the second access stratum key of the terminal.

Based on this solution, when a handover procedure of the terminal fails, the terminal initiates a reestablishment procedure. When a base station reselected by the terminal is a base station (that is, a target base station) to which the terminal is handed over in the handover procedure, because a key of the base station is updated in the handover procedure, and key derivation information is stored, the base station includes the key derivation information in a reestablishment message to be sent to the terminal. Therefore, the terminal can update a key of the terminal based on the key derivation information, so that the key of the terminal can be consistent with a key on a network side.

In a possible implementation, the key derivation information in the first aspect includes a first indication and a NASC, the NASC includes a second indication and a downlink NAS COUNT indication, the first indication is used to indicate to update an access stratum key, and the second indication is used to indicate to update a root key. That the terminal derives the first access stratum key of the terminal based on the key derivation information includes: The terminal derives a second root key of the terminal based on the second indication, the downlink NAS COUNT indication, and a first root key of the terminal; and the terminal derives the first access stratum key of the terminal based on the first indication and the second root key of the terminal.

Optionally, the NASC further includes a first NAS MAC and an identifier of a selected algorithm; the terminal may further derive a non-access stratum key based on the second root key of the terminal; and the terminal checks the first NAS MAC based on the selected algorithm, the downlink NAS COUNT indication, and the non-access stratum key.

In a possible implementation, the downlink NAS COUNT indication includes low L1 bits of a downlink NAS COUNT, where L1 is a positive integer, and the first NAS MAC includes all bits of a second NAS MAC; and that the terminal checks the first NAS MAC based on the selected algorithm, the downlink NAS COUNT indication, and the non-access stratum key includes: The terminal obtains a second downlink NAS COUNT based on the downlink NAS COUNT indication and a first downlink NAS COUNT of the terminal; the terminal generates a NAS MAC based on the non-access stratum key, the selected algorithm, and the second downlink NAS COUNT; and the terminal checks the first NAS MAC of the NASC based on the generated NAS MAC.

In another possible implementation, the downlink NAS COUNT indication includes low L2 bits of a downlink NAS COUNT, and the first NAS MAC includes low L3 bits or high L4 bits of a second NAS MAC, where L2 is a positive integer, and L3 is a positive integer, L4 is a positive integer; and that the terminal checks the first NAS MAC based on the selected algorithm, the downlink NAS COUNT indication, and the non-access stratum key includes: The terminal obtains a second downlink NAS COUNT based on the downlink NAS COUNT indication and a first downlink NAS COUNT of the terminal; the terminal generates a NAS MAC based on the non-access stratum key, the selected algorithm, and the second downlink NAS COUNT; and the terminal checks the first NAS MAC of the NASC based on low L3 bits or high L4 bits of the generated NAS MAC.

In another possible implementation, the downlink NAS COUNT indication includes all bits of a downlink NAS COUNT, and the first NAS MAC includes low L5 bits of a second NAS MAC, where L5 is a positive integer; and that the terminal checks the first NAS MAC based on the selected algorithm, the downlink NAS COUNT indication, and the non-access stratum key includes: The terminal generates a NAS MAC based on the non-access stratum key, the selected algorithm, and the downlink NAS COUNT indication of the NASC; and the terminal checks the first NAS MAC of the NASC based on low L5 bits of the generated NAS MAC.

In another possible implementation, the key derivation information in the first aspect includes a first indication, and the first indication is used to indicate to update an access stratum key; and that the terminal derives the first access stratum key of the terminal based on the key derivation information includes: The terminal derives the first access stratum key of the terminal based on the first indication and a first root key of the terminal.

In another possible implementation, the key derivation information in the first aspect includes a NASC, and the NASC may include an identifier of a selected algorithm, a NAS MAC, and the like. The terminal checks the NAS MAC and generates Knas.

In a possible implementation, in any of the foregoing embodiments, before the terminal sends the reestablishment request message to the base station, the method further includes: The terminal receives a radio resource control RRC reconfiguration message from the base station, where the RRC reconfiguration message includes a configuration parameter, the NCC, and the key derivation information; and the terminal performs configuration based on the configuration parameter, where the configuration fails.

In another possible implementation, in any of the foregoing embodiments, before the terminal sends the reestablishment request message to the base station, the method further includes: The terminal receives an RRC reconfiguration message from the base station, where the RRC reconfiguration message includes the NCC and the key derivation information; the terminal starts a timer; the terminal sends an RRC reconfiguration complete message to the base station; and the terminal determines that the timer expires.

According to a second aspect, this application provides a wireless communication method, used in a scenario in which a handover of a terminal fails, including: A base station receives a reestablishment request message from the terminal, where the reestablishment request message is used to reestablish an RRC connection; the base station sends a reestablishment message to the terminal, where the reestablishment message includes a next hop chaining counter NCC and key derivation information, and the key derivation information is used to indicate the terminal to derive an access stratum key; and the base station receives a reestablishment complete message from the terminal, where the reestablishment complete message is protected by using a key derived based on the access stratum key.

Based on this solution, when a handover procedure of the terminal fails, the terminal initiates a reestablishment procedure. When a base station reselected by the terminal is a base station (that is, a target base station) to which the terminal is handed over in the handover procedure, because a key of the base station is updated in the handover procedure, and key derivation information is stored, the base station includes the key derivation information in a reestablishment message to be sent to the terminal. Therefore, the terminal can update a key of the terminal based on the key derivation information, so that the key of the terminal can be consistent with a key on a network side.

In a possible implementation, the key derivation information in the second aspect includes a first indication and a non-access stratum container NASC, the NASC includes a second indication and a downlink NAS COUNT indication, the first indication is used to indicate to update the access stratum key, and the second indication is used to indicate to update a root key. Optionally, the NASC further includes a first NAS MAC and an identifier of a selected algorithm.

In a possible implementation, the downlink NAS COUNT indication includes low L1 bits of a downlink NAS COUNT, and the first NAS MAC includes all bits of a second NAS MAC.

In another possible implementation, the downlink NAS COUNT indication includes low L2 bits of a downlink NAS COUNT, and the first NAS MAC includes low L3 bits or high L4 bits of a second NAS MAC.

In another possible implementation, the downlink NAS COUNT indication includes all bits of a downlink NAS COUNT, and the first NAS MAC includes low L5 bits of a second NAS MAC.

In another possible implementation, the key derivation information in the first aspect includes a first indication, and the first indication is used to indicate to update the access stratum key.

In a possible implementation, before the base station the sends the reestablishment message to the terminal, the base station determines the first indication based on a buffered intermediate parameter, where the intermediate parameter is a new security context indicator NSCI obtained by the base station from an access and mobility management function entity in a handover preparation process, and the NSCI is used to indicate the base station to update the access stratum key.

In another possible implementation, before the base station receives the reestablishment request message from the terminal, the base station obtains a new security context indicator NSCI from an access and mobility management function entity in a handover preparation process, where the NSCI is used to indicate the base station to update the access stratum key; and the base station determines and stores the first indication based on the NSCI; and before the base station sends the reestablishment message to the terminal, the base station obtains the stored first indication.

In another possible implementation, before the base station receives the reestablishment request message from the terminal, the base station obtains the NASC from an access and mobility management function entity in a handover preparation process; and the base station stores the NASC; and before the base station sends the reestablishment message to the terminal, the base station obtains the stored NASC.

The NASC is obtained based on the buffered NASC, and the NASC is obtained from the access and mobility management function entity in the handover preparation process.

In a possible implementation, in any of the foregoing embodiments, before the base station receives the reestablishment request message from the terminal, the method further includes: The base station sends an RRC reconfiguration message to the terminal, where the RRC reconfiguration message includes a configuration parameter, the NCC, and the key derivation information.

According to a third aspect, this application provides an apparatus. The apparatus has a function of implementing the apparatus in the foregoing method embodiment. The function may be implemented by hardware, or may be implemented by hardware executing corresponding software. The hardware or the software includes one or more modules corresponding to the function.

In a possible design, the apparatus includes a processor, a memory, a bus, and a communications interface. The memory stores a computer executable instruction. The processor and the memory are connected by using the bus. When the apparatus runs, the processor executes the computer executable instruction stored in the memory, so that the apparatus performs the wireless communication method according to any one of the first aspect and the second aspect or the implementations of the first aspect and the second aspect. For example, the apparatus may be a terminal or a base station.

In another possible design, the apparatus may be a chip, for example, a chip in a terminal or a chip in a base station. The chip includes a processing unit, and optionally further includes a storage unit. The chip may be configured to perform the wireless communication method according to any one of the first aspect and the second aspect or the implementations of the first aspect and the second aspect.

According to a fourth aspect, this application provides a computer storage medium. The computer storage medium stores a computer software instruction used by the terminal device or the base station. The computer software instruction includes a program designed for performing any one of the foregoing aspects.

According to a fifth aspect, this application provides a computer program product. The computer program product includes a computer software instruction. The computer software instruction may be loaded by a processor to implement a procedure in the wireless communication method according to any one of the foregoing aspects.

According to a sixth aspect, this application provides a system. The system includes the terminal according to any one of the first aspect or the implementations of the first aspect, and the base station according to any one of the second aspect or the implementations of the second aspect.

These aspects or other aspects of the present invention are clearer and more comprehensible in descriptions of the following embodiments.

DESCRIPTION OF EMBODIMENTS

To make the objectives, the technical solutions, and advantages of this application clearer, the following further describes this application in detail with reference to the accompanying drawings. A specific operation method in method embodiments may also be used in an apparatus embodiment or a system embodiment. In the descriptions of this application, unless otherwise stated, "a plurality of" means two or more than two.

Architectures and service scenarios described in this application intend to more clearly describe the technical solutions in this application, but are not intended to limit the technical solutions provided in this application. A person of ordinary skill in the art may know that as network architectures evolve and a new service scenario emerges, the technical solutions provided in this application are also applicable to similar technical problems.

Figure 1:
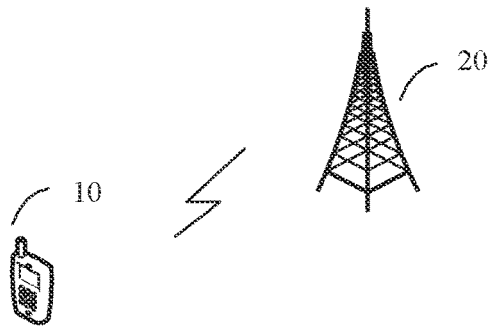
FIG. 1 is a schematic diagram of a possible network architecture according to this application.

FIG. 1 is a schematic diagram of a possible network architecture to which this application is applicable. The network architecture includes at least one terminal 10. The terminal 10 communicates with a base station 20 by using a radio interface. For clarity, only one base station and one terminal are shown in the figure.

The terminal is a device having a wireless transceiver function. The terminal may be deployed on land, and includes an indoor device, an outdoor device, a hand-held device, or a vehicle-mounted device. The terminal may also be deployed on a water surface (for example, on a ship), and may also be deployed in air (for example, in an aircraft, a balloon, or a satellite). The terminal may be a mobile phone, a tablet computer, a computer having a wireless transceiver function, a virtual reality (VR) terminal, an augmented reality (AR) terminal, a wireless terminal in industrial control, a wireless terminal in self driving, a wireless terminal in telemedicine, a wireless terminal in smart grid, a wireless terminal in transportation safety, a wireless terminal in a smart city, or a wireless terminal in a smart home, or may be user equipment (UE), or the like.

The base station is a device that provides a wireless communication function for the terminal. For example, the base station includes but is not limited to a next-generation NodeB (gNB) in 5G, an evolved NodeB (eNB), a radio network controller (RNC), a NodeB (NB), a base station controller (BSC), a base transceiver station (BTS), a home base station (for example, a home evolved NodeB or a home NodeB, HNB), and a baseband unit (BBU).

In a cell, the base station and the terminal may transmit data by using an air interface resource. The air interface resource may include a time domain resource and a frequency domain resource, and the time domain resource and the frequency domain resource may also be referred to as time-frequency resources. The frequency domain resource may be located within a specified frequency range. The frequency range may also be referred to as a band or a frequency band, and a width of the frequency domain resource may be referred to as a bandwidth (BW).

In this application, an access and mobility management function entity is mainly used for attachment, mobility management, a tracking area update procedure, and the like of a terminal in a mobile network. In 5th generation (5G) communications, the access and mobility management function entity may be an access and mobility management function (AMF) network element. In future communications such as 6th generation (6G) communications, the access and mobility management function entity may still be an AMF network element, or may have another name. This is not limited in this application. For ease of description, an example in which the access and mobility management function entity is an AMF is used for description in this application. In addition, in a handover procedure of the terminal, an AMF to which the terminal initially establishes a connection is referred to as a source AMF, and an AMF to which the terminal establishes a connection after a handover is referred to as a target AMF.

In this application, root keys may include Kamf and Kamf*. Kamf is referred to as a first root key, and Kamf* is referred to as a second root key. Knas may be referred to as a non-access stratum key. Access stratum keys may include KgNB, KgNB*, a next hop (NH), and the like. KgNB or NH is referred to as a first access stratum key, and KgNB* is referred to as a second access stratum key.

In this application, the terminal may receive a first indication and a second indication from the network side.

The first indication is used to indicate to update an access stratum key (AS key re-keying). Alternatively, it may also be understood that the first indication is used to indicate the terminal to derive the access stratum key based on the root key. In specific implementation, a keychangeindicator may be used for implementation. For example, in an implementation, if the received keychangeindicator is a first preset value, for example, "1" or "true", it indicates that the access stratum key needs to be updated; or if the received keychangeindicator is a second preset value, for example, "0" or "false", it indicates that the access stratum key does not need to be updated. For another example, in another implementation, the keychangeindicator is the first indication. To be specific, as long as the keychangeindicator is received, it indicates that the access stratum key needs to be updated, or if the keychangeindicator is not received, it indicates that the access stratum key does not need to be updated.

The second indication is used to indicate that the root key is derived horizontally. Alternatively, it may also be understood that the second indication is used to indicate to update the root key. In specific implementation, a k_AMF_change_flag may be used for implementation. For example, in an implementation, if the received k_AMF_change_flag is a third preset value, for example, "1" or "true", it indicates that the root key needs to be updated, or if the received k_AMF_change_flag is "0" or "false", it indicates that the root key does not need to be updated. For another example, in another implementation, the k_AMF_change_flag is the second indication. To be specific, as long as the k_AMF_change_flag is received, it indicates that the root key needs to be updated, or if the k_AMF_change_flag is not received, it indicates that the root key does not need to be updated.

FIG. 2A to FIG. 4 are schematic diagrams of three handover procedures of a terminal according to this application. FIG. 2A to FIG. 4 respectively correspond to three cases in the handover procedures:

Case 1: In a handover procedure, a source AMF updates a root key, that is, the root key is updated from Kamf to Kamf*.

Case 2: In a handover procedure, a source AMF does not update a root key, that is, the root key remains Kamf, but a target AMF selects a new algorithm.

Case 3: Before a handover, root keys of the terminal and a source AMF are both updated to Kamf, a handover procedure is performed before a source base station and the terminal derive a new access stratum key KgNB based on Kamf, and the source AMF does not update the root key in the handover procedure, that is, the root key remains Kamf.

It should be noted that, in Case 1 or Case 3, the target AMF may select a new algorithm, or may not select a new algorithm.

Figure 2A:
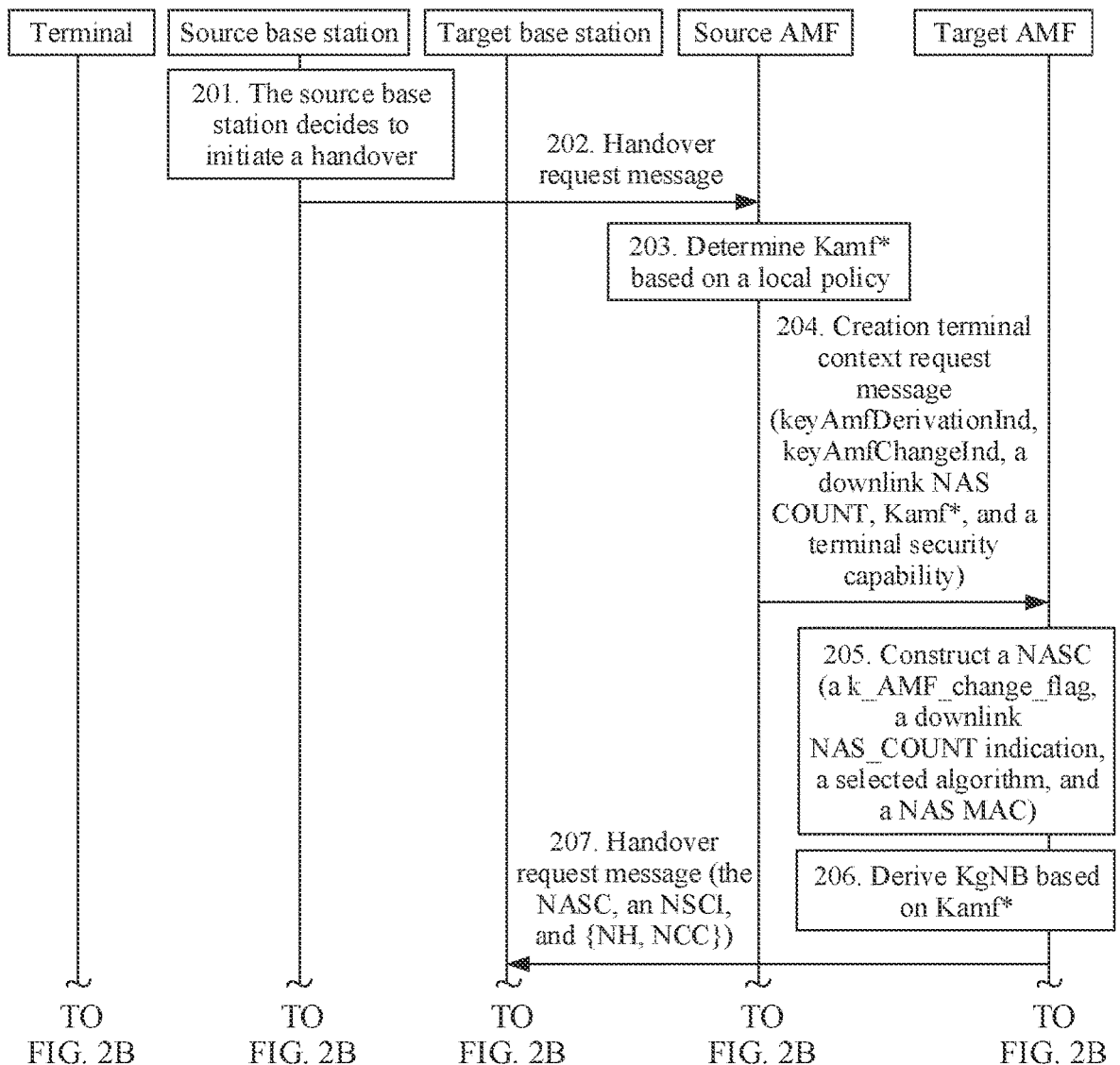
FIG. 2A and FIG. 2B are a schematic diagram of a handover procedure of a terminal in the conventional technology.
Figure 2B:
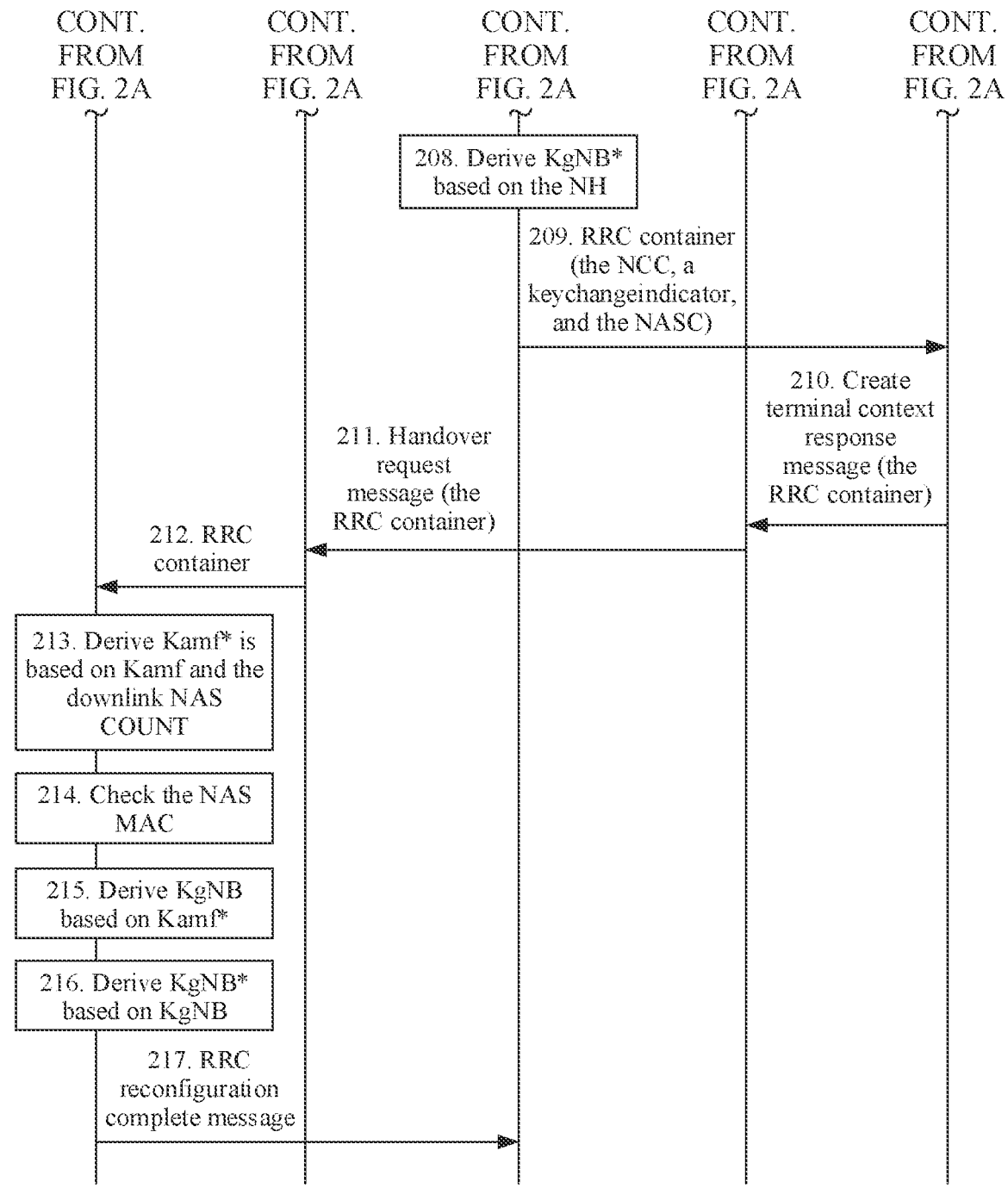

FIG. 2A and FIG. 2B are a schematic diagram of a handover procedure of a terminal in the conventional technology. The terminal is handed over from a source base station to a target base station. The handover procedure shown in FIG. 2A and FIG. 2B corresponds to Case 1. The handover procedure includes the following steps.

Step 201. The source base station decides to initiate a handover.

Step 202. The source base station sends a handover required message to a source access and mobility management function (AMF).

Step 203. The source AMF determines Kamf* based on a local policy.

If the source AMF determines, based on the local policy, that a root key Kamf needs to be updated, the source AMF derives an updated root key Kamf* based on Kamf and a downlink NAS COUNT. Kamf and the downlink NAS COUNT are content that is in a terminal context and that is stored in the source AMF. The downlink NAS COUNT is a freshness parameter.

Step 204. The source AMF sends a create terminal context request message to a target AMF.

In an implementation, the create terminal context request message may be, for example, an Namf_Communication_CreateUEContext Request message.

The create terminal context request message may include a third indication (represented by keyAmfDerivationInd below), a fourth indication (represented by keyAmfChangeInd below), a downlink NAS COUNT, Kamf*, and a terminal security capability. Optionally, the create terminal context request message may include an original algorithm used by the terminal, that is, an algorithm currently used by the terminal.

The keyAmfDerivationInd is used to indicate that Kamf* is newly derived. The keyAmfChangeInd is used to indicate that Kamf* is temporarily not synchronized with the base station, that is, indicate that an access stratum key of the base station has not been updated based on Kamf*. The terminal security capability is used to indicate a security algorithm supported by the terminal. The downlink NAS COUNT is a freshness parameter.

Step 205. The target AMF constructs a NAS container (NASC), and.

The constructed NASC may include a k_AMF_change_flag, a downlink NAS_COUNT indication, an identifier of a selected algorithm, a NAS MAC, and the like.

The k_AMF_change_flag is generated based on the received keyAmfDerivationInd, and the k_AMF_change_flag is used to indicate, to the terminal, that Kamf* is newly derived. In specific implementation, for example, when a value of k_AMF_change_flag is "1" or "true", it indicates that Kamf* is newly derived, or when a value of k_AMF_change_flag is "0" or "false", it indicates that Kamf* is not newly derived.

The downlink NAS COUNT indication may be all or some bits of a NAS COUNT received from the source AMF. The selected algorithm is selected by the target AMF. In an implementation, the target AMF selects an algorithm based on the terminal security capability and a preset policy. For example, an algorithm with a highest priority may be selected from the terminal security capability based on a local algorithm priority list. The NAS MAC is obtained by the target AMF through calculation for the NASC based on the selected algorithm and Knas, and Knas is derived by the target AMF based on Kamf*. Optionally, the terminal derives Knas based on Kamf, the identifier of the selected algorithm, and a selected algorithm type.

Step 206. The target AMF derives a first access stratum key (KgNB) based on Kamf*.

Step 207. The target AMF sends a handover request (HO Request) message to the target base station, where the message may include a NASC, a new security context indicator (NSCI), and {NH, next hop chaining counter (NCC)}.

The NSCI is generated by the target AMF based on the keyAmfChangeInd, and the NSCI is used to indicate the base station to update the access stratum key. The target AMF sets the NH in {NH, NCC} to KgNB generated by the target AMF in step 206, and sets the NCC to 0.

Figure 5:
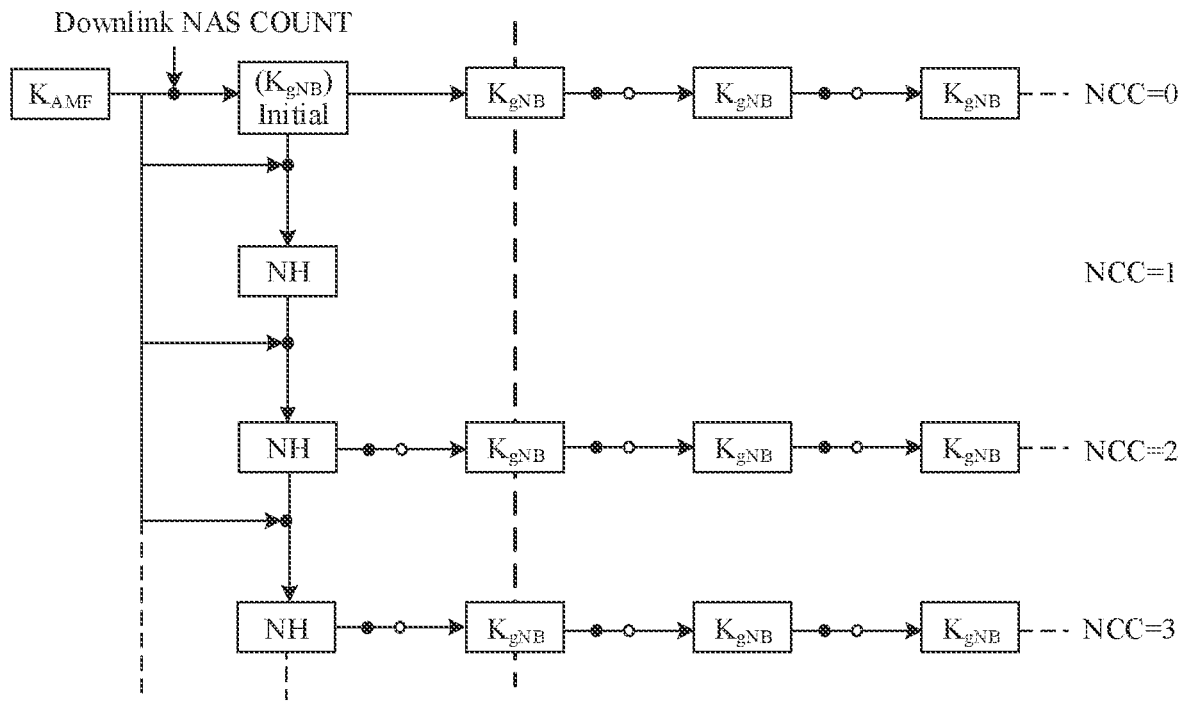
FIG. 5 is a schematic diagram of key derivation in 5G.

In an alternative implementation of step 206 and step 207, the target AMF may derive a next NH based on Kamf* and a current NH, and then add 1 to the NCC. In addition, the handover request message sent by the target AMF to the target base station includes the NASC, the NSCI, and {NH, NCC}. The NH is a derived NH, and the NCC is an updated NCC. FIG. 5 is a schematic diagram of key derivation in 5G.

In an example, if a current NCC of the target AMF is equal to 0, the target AMF first derives an NH (namely, the first NH from top to bottom in FIG. 5) based on Kamf* and current KgNB, and then adds 1 to the NCC, that is, the NCC=1.

In another example, if a current NCC of the target AMF is equal to 1, the target AMF first derives a next NH (that is, the second NH from top to bottom in FIG. 5) based on Kamf* and a current NH (that is, an NH corresponding to the NCC=1 in the figure, that is, the first NH from top to bottom in FIG. 5), and then adds 1 to the NCC, that is, the NCC=2.

In another example, if a current NCC of the target AMF is equal to 2, the target AMF first derives a next NH (that is, the third NH from top to bottom in FIG. 5) based on Kamf* and a current NH (that is, an NH corresponding to the NCC=2 in the figure, that is, the second NH from top to bottom in FIG. 5), and then adds 1 to the NCC, that is, the NCC=3.

Step 208. The target base station derives KgNB* based on the NH.

For example, in an implementation, if the NH=KgNB, the target base station derives KgNB* based on KgNB. In a specific implementation, the target base station may derive KgNB* based on a target physical cell identifier (PCI), a target cell absolute radio frequency channel number-downlink (ARFCN-DL), and KgNB.

For another example, in another implementation, if the NH is derived by the target AMF based on Kamf* and a current NH of the target AMF, the target base station derives KgNB* based on the received NH. In a specific implementation, the target base station may derive KgNB* based on a target PCI, a target cell ARFCN-DL, and the NH.

Optionally, the target base station may derive a plurality of KgNB* that are in a one-to-one correspondence with a plurality of cells of the target base station.

Step 209. The target base station sends an RRC container to the target AMF.

The RRC container includes a radio resource control (RRC) reconfiguration (RRCReconfiguration) message, and the message includes an NCC, a keychangeindicator, and a NASC. The NCC is the received NCC in step 207. The NASC is the received NASC in step 207. The keychangeindicator is generated by the target base station based on the received NSCI.

Step 210. The target AMF sends a create terminal context response message to the source AMF, where the message includes the RRC container.

In an implementation, the create terminal context response message may be an Namf_Communication_CreateUEContext Response message.

Step 211. The source AMF sends a handover request message to the source base station, where the message includes the RRC container.

Step 212. The source base station sends the RRC container to the terminal. The RRC container includes the RRC reconfiguration (RRCReconfiguration) message.

The RRC reconfiguration message includes the NCC, the keychangeindicator, and the NASC.

Step 213. The terminal derives Kamf* based on Kamf and the downlink NAS COUNT.

If the terminal determines, based on the k_AMF_change_flag in the NASC, that Kamf* needs to be derived, the terminal obtains a downlink NAS COUNT based on the downlink NAS COUNT indication in the NASC, and then derives Kamf* based on Kamf and the downlink NAS COUNT.

Step 214. The terminal checks the NAS MAC.

The terminal derives Knas based on Kamf*, and then checks the NAS MAC in the NASC by using Knas and the algorithm indicated by the identifier that is of the selected algorithm and that is included in the NASC. Specifically, the terminal calculates a NAS MAC based on Knas, the selected algorithm, and the NASC, and then compares the calculated NAS MAC with the NAS MAC in the received NASC to determine whether the calculated NAS MAC is consistent with the NAS MAC in the received NASC. If the calculated NAS MAC is consistent with the NAS MAC in the received NASC, integrity check succeeds. If the calculated NAS MAC is not consistent with the NAS MAC in the received NASC, integrity check fails.

Step 215. The terminal derives KgNB based on Kamf*.

If the terminal determines, based on the received keychangeindicator, that KgNB needs to be derived, the terminal derives KgNB based on Kamf*, and sets an NCC corresponding to KgNB to 0.

Step 216. The terminal compares the received NCC with a current NCC of the terminal. Because values of the two NCCs are both 0, the two NCCs are equal, and the terminal derives KgNB* based on KgNB.

It should be noted that, if step 206 and step 207 are implemented by the alternative manner thereof, step 215 and step 216 are replaced with the following implementation: The terminal determines, based on the keychangeindicator, that KgNB needs to be derived, and sets the NCC corresponding to KgNB to 0. The terminal first determines whether the current NCC of the terminal is the same as the NCC received by the terminal. In this case, a determining result should be that the current NCC of the terminal is not the same as the NCC received by the terminal, and the terminal derives a next-layer NH based on Kamf* and the current NH, and then adds 1 to the current NCC of the terminal. Then, the terminal continues to determine whether the current NCC of the terminal is the same as the NCC received by the terminal, until the current NCC of the terminal is the same as the NCC received by the terminal. In this case, the terminal derives KgNB* based on the current NH. In a specific implementation, the terminal may derive KgNB* based on the target cell PCI, the target cell ARFCN-DL, and the current NH.

Descriptions are provided by using examples below with reference to FIG. 5. In an example, if the current NCC of the terminal is equal to 0, and the NCC received by the terminal is 1, the terminal first derives the NH based on Kamf* and the current KgNB, adds 1 to the current NCC of the terminal to obtain the NCC=1, and then derives KgNB* based on the NH of the terminal.

Referring to FIG. 5, the foregoing derivation process may be understood as follows: The terminal first performs longitudinal derivation on the NH and adds 1 to the NCC of the terminal, until the NCC of the terminal is equal to the NCC received by the terminal, and then the terminal performs horizontal derivation based on a newest derived NH, to obtain KgNB*.

Step 217. The terminal sends an RRC reconfiguration complete (RRCReconfigurationComplete) message to the target base station.

In the foregoing handover procedure of the terminal, a terminal side derives Kamf*, Knas, and KgNB* based on original Kamf. A target AMF side derives Kamf* and Knas based on the original Kamf, and a target base station side derives KgNB*. Therefore, keys (KgNB*) are synchronized between the terminal and the target base station, and keys (Knas and Kamf*) are synchronized between the terminal and the target AMF.

In the foregoing procedure, handover procedure failures are as follows: For example, a handover failure occurs because the RRC reconfiguration complete message in step 217 is not received by a network side (for example, the terminal starts a timer before step 217, and the terminal does not receive an ACK message from the base station before the timer expires, which indicates that the terminal fails to send the RRC reconfiguration complete message), or the RRC reconfiguration message in the RRC container received by the terminal in step 212 causes a terminal reconfiguration failure (for example, after step 212, the terminal performs configuration based on a configuration parameter in the RRC reconfiguration message, and the configuration fails) due to a configuration parameter error or the like. In these cases, a key that has been derived by the terminal is not activated due to a failure. Therefore, a previous key is used in a subsequent RRC procedure. For example, keys used by the terminal are rolled back to Kamf and KgNB1 (herein, KgNB1 is derived based on Kamf).

Figure 3:
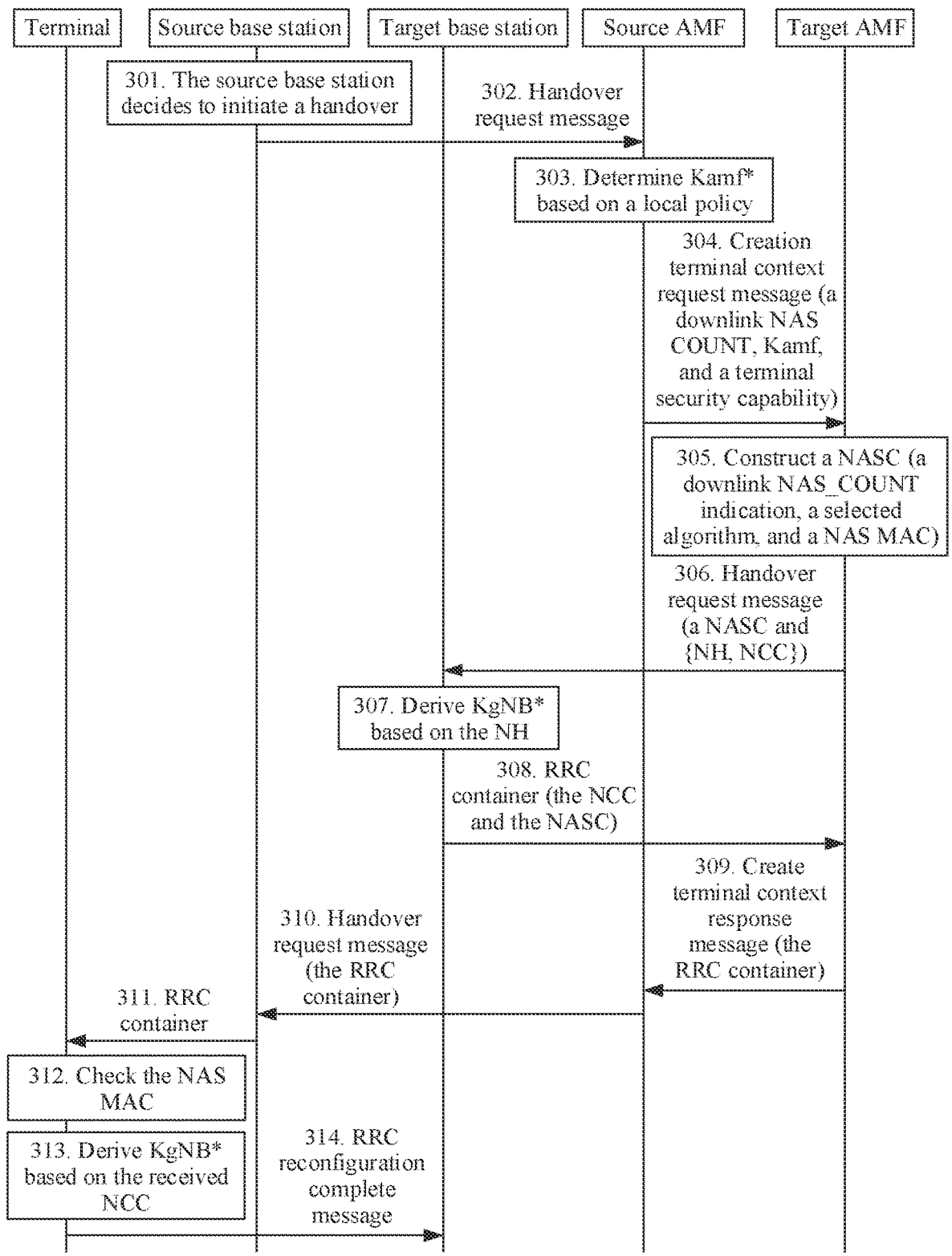
FIG. 3 is another schematic diagram of a handover procedure of a terminal in the conventional technology.

FIG. 3 is a schematic diagram of a handover procedure of a terminal in the conventional technology. The terminal is handed over from a source base station to a target base station. The handover procedure shown in FIG. 3 corresponds to Case 2. The handover procedure includes the following steps.

Step 301 and step 302 are the same as step 201 and step 202 in the handover procedure shown in FIG. 2A. Refer to the foregoing descriptions.

Step 303. The source AMF determines Kamf based on a local policy.

The source AMF determines not to update Kamf based on the local policy. Further, the source AMF further derives a next NH based on Kamf and a next NH, and adds 1 to an NCC.

Step 304. The source AMF sends a create terminal context request message to a target AMF.

In an implementation, the create terminal context request message may be, for example, an Namf_Communication_CreateUEContext Request message.

The create terminal context request message may include a downlink NAS COUNT, Kamf, and a terminal security capability. Optionally, the create terminal context request message may include an original algorithm used by the terminal, that is, an algorithm currently used by the terminal.

The create terminal context request message may further include an NH and an NCC that are generated by the source AMF.

In an implementation, the create terminal context request message may further include keyAmfDerivationInd, and the keyAmfDerivationInd is used to indicate that Kamf is not updated. For example, when a value of the keyAmfDerivationInd is "0" or "false", it indicates that Kamf is not updated. In another implementation, if the create terminal context request message does not include the keyAmfDerivationInd, the target AMF determines that the keyAmfDerivationInd is not received, and therefore determines that Kamf is not updated.

Step 305. The target AMF constructs a NAS container (NASC).

The constructed NASC may include an identifier of a selected algorithm, a NAS MAC, and the like.

The selected algorithm is selected by the target AMF. In an implementation, the target AMF selects an algorithm based on the terminal security capability and a preset policy. For example, an algorithm with a highest priority may be selected from the terminal security capability based on a local algorithm priority list. The NAS MAC is obtained by the target AMF through calculation for the NASC based on the selected algorithm and Knas, and Knas is derived by the target AMF based on Kamf*. Optionally, the terminal derives Knas based on Kamf, the identifier of the selected algorithm, and a selected algorithm type.

In an implementation, the create terminal context request message further includes the keyAmfDerivationInd, and the keyAmfDerivationInd is used to indicate that Kamf is not updated. For example, when the value of the keyAmfDerivationInd is "0" or "false", it indicates that Kamf is not updated. Alternatively, if the create terminal context request message does not include the keyAmfDerivationInd, the target AMF determines that Kamf is not updated. Therefore, when the target AMF constructs the NASC, the NASC may include a k_AMF_change_flag, and a value of the k_AMF_change_flag may be, for example, "0" or "false", to indicate that Kamf is not updated, or the NASC does not include the k_AMF_change_flag.

Step 306. The target AMF sends a handover request (HO Request) message to the target base station, where the message may include the NASC and {NH, NCC}.

The target AMF sets the NH in {NH, NCC} to the NH generated by the source AMF in step 303, and sets the NCC to the NCC generated by the source AMF in step 303.

Step 307. The target base station derives KgNB* based on the NH.

The NH is an NH received by the target base station from the target AMF.

In a specific implementation, the target base station may derive KgNB* based on a target PCI, a target cell ARFCN-DL, and the NH.

Optionally, the target base station may derive a plurality of keys KgNB* that are in a one-to-one correspondence with a plurality of cells of the target base station.

Step 308. The target base station sends an RRC container to the target AMF.

The RRC container includes an RRC connection reconfiguration message, and the message includes the NCC and the NASC. The NCC is the received NCC in step 307. The NASC is the received NASC in step 306.

Step 309. The target AMF sends a create terminal context response message to the source AMF, where the message includes the RRC container.

In an implementation, the create terminal context response message may be an Namf_Communication_CreateUEContext Response message.

The RRC container includes the RRC connection reconfiguration message, and the message includes the NCC and the NASC.

Step 310. The source AMF sends a handover request message to the source base station, where the message includes the RRC container.

The RRC container includes the RRC connection reconfiguration message, and the message includes the NCC and the NASC.

Step 311. The source base station sends the RRC container to the terminal. The RRC container includes the RRC reconfiguration (RRCReconfiguration) message.

Step 312. The terminal checks the NAS MAC.

The terminal derives Knas based on Kamf, and then checks the NAS MAC in the NASC by using Knas and the algorithm indicated by the identifier that is of the selected algorithm and that is included in the NASC. Specifically, the terminal calculates a NAS MAC based on Knas, the selected algorithm, and the NASC, and then compares the calculated NAS MAC with the NAS MAC in the received NASC to determine whether the calculated NAS MAC is consistent with the NAS MAC in the received NASC. If the calculated NAS MAC is consistent with the NAS MAC in the received NASC, integrity check succeeds. If the calculated NAS MAC is not consistent with the NAS MAC in the received NASC, integrity check fails.

Step 313. The terminal derives KgNB* based on the received NCC.

Specifically, the terminal determines whether the NCC of the terminal is the same as an NCC in the received NASC. In this case, the NCC of the terminal should be different from the NCC in the received NASC. Therefore, the terminal derives the NH based on Kamf and a downlink NAS COUNT in the NASC, and then derives KgNB* based on the NH. Descriptions are provided by using examples below with reference to FIG. 5.

In an example, if a current NCC of the terminal is equal to 0, and an NCC received by the terminal is 1, the terminal first derives KgNB based on Kamf, sets a current NH of the terminal to KgNB, adds 1 to the current NCC of the terminal to obtain the NCC=1, and then derives KgNB* based on the current NH.

Referring to FIG. 5, the foregoing derivation process may be understood as follows: The terminal first performs longitudinal derivation on the NH and adds 1 to the NCC of the terminal, until the NCC of the terminal is equal to the NCC received by the terminal, and then the terminal performs horizontal derivation based on a newest derived NH, to obtain KgNB*.

Step 314. The terminal sends an RRC reconfiguration complete message to the target base station.

In the foregoing handover procedure of the terminal, a terminal side derives KgNB* and Knas, a target base station side also derives KgNB*, and a target AMF side derives Knas. Therefore, keys (KgNB*) are synchronized between the terminal and the target base station, and keys (Knas) are synchronized between the terminal and the target AMF.

In the foregoing procedure, handover procedure failures are as follows: For example, a handover failure occurs because the RRC reconfiguration complete message in step 314 is not received by a network side (for example, the terminal starts a timer before step 314, and the terminal does not receive an ACK message from the base station before the timer expires, which indicates that the terminal fails to send the RRC reconfiguration complete message), or the RRC reconfiguration message in the RRC container received by the terminal in step 311 causes a terminal reconfiguration failure (for example, after step 311, the terminal performs configuration based on a configuration parameter in the RRC reconfiguration message, and the configuration fails) due to a configuration parameter error or the like. In these cases, a key that has been derived by the terminal is not activated due to a failure. Therefore, a previous key is used in a subsequent RRC procedure. For example, a key used by the terminal is rolled back to KgNB (herein, KgNB is derived based on Kamf).

Figure 4:
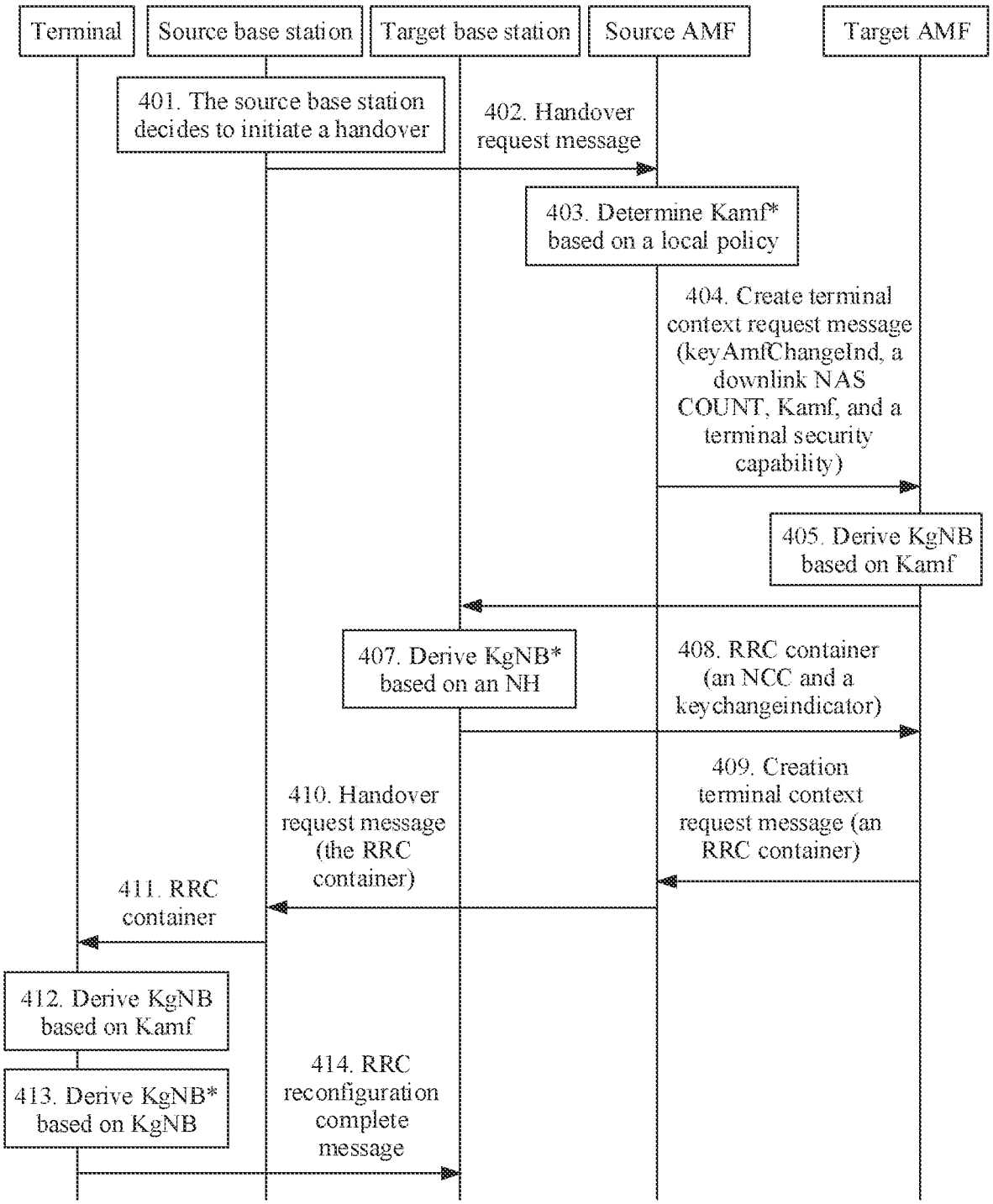
FIG. 4 is another schematic diagram of a handover procedure of a terminal in the conventional technology.

FIG. 4 is a schematic diagram of a handover procedure of a terminal in the conventional technology. The terminal is handed over from a source base station to a target base station. A handover procedure shown in FIG. 4 corresponds to Case 3.

The handover procedure includes the following steps.

Step 401 and step 402 are the same as step 201 and step 202 in the handover procedure shown in FIG. 2A. Refer to the foregoing descriptions.

Step 403. The source AMF determines Kamf based on a local policy.

The source AMF determines not to update Kamf based on the local policy.

Further, the source AMF determines that the source base station and the terminal have not updated an access stratum key KgNB. Specifically, before the terminal performs the handover procedure, Kamf of the terminal and Kamf of the source AMF have been synchronized, but the terminal performs the terminal handover procedure before the terminal and the source base station update the access stratum key KgNB. Therefore, the target base station and the terminal may be notified to update the access stratum key KgNB in the handover procedure.

Step 404. The source AMF sends a create terminal context request message to a target AMF.

In an implementation, the create terminal context request message may be, for example, an Namf_Communication_CreateUEContext Request message.

The create terminal context request message may include keyAmfChangeInd, a downlink NAS COUNT, Kamf, and a terminal security capability. Optionally, the create terminal context request message may include an original algorithm used by the terminal, that is, an algorithm currently used by the terminal.

The keyAmfChangeInd is used to indicate that Kamf is temporarily not synchronized with the base station, that is, indicate that the access stratum key of the base station has not been updated based on Kamf. The terminal security capability is used to indicate a security algorithm supported by the terminal. The downlink NAS COUNT is a freshness parameter.

After receiving the create terminal context request message, the target AMF selects a new algorithm based on the terminal security capability and a local algorithm priority list, but the selected new algorithm is the same as the original algorithm of the terminal, or the original algorithm of the terminal is a highest-priority algorithm in the local algorithm priority list of the target AMF. Therefore, the target AMF does not select the new algorithm. In this case, because the algorithm of the terminal does not need to be updated, and Kamf does not need to be updated either, the target AMF does not construct a NASC.

Step 405. The target AMF derives a first access stratum key (KgNB) based on Kamf.

Step 406. The target AMF sends a handover request (HO Request) message to the target base station, where the message may include an NSCI and {NH, NCC}.

The NSCI is generated by the target AMF based on the keyAmfChangeInd, and the NSCI is used to indicate the base station to update the access stratum key. The target AMF sets the NH in {NH, NCC} to KgNB generated by the target AMF in step 405, and sets the NCC to 0.

In an alternative implementation of step 405 and step 406, the target AMF may derive a next NH based on Kamf and a current NH, and then add 1 to the NCC. In addition, the NH included in the handover request message sent by the target AMF to the target base station is a derived NH, and the NCC included in the handover request message sent by the target AMF to the target base station is an updated NCC. FIG. 5 is a schematic diagram of key derivation in 5G.

In an example, if a current NCC of the target AMF is equal to 0, the target AMF first derives an NH (namely, the first NH from top to bottom in the figure) based on Kamf and current KgNB, and then adds 1 to the NCC, that is, the NCC=1.

In another example, if a current NCC of the target AMF is equal to 1, the target AMF first derives a next NH (that is, the second NH from top to bottom in the figure) based on Kamf and a current NH (that is, an NH corresponding to the NCC=1 in the figure, that is, the first NH from top to bottom in the figure), and then adds 1 to the NCC, that is, the NCC=2.

In another example, if a current NCC of the target AMF is equal to 2, the target AMF first derives a next NH (that is, the third NH from top to bottom in the figure) based on Kamf and a current NH (that is, an NH corresponding to the NCC=2 in the figure, that is, the second NH from top to bottom in the figure), and then adds 1 to the NCC, that is, the NCC=3.

Step 407. The target base station derives KgNB* based on the NH.

For example, if the NH=KgNB, the target base station derives KgNB* based on KgNB. In a specific implementation, the target base station may derive KgNB* based on a target PCI, a target cell ARFCN-DL, and KgNB.

For another example, if the NH is derived by the target AMF based on Kamf and a current NH of the target AMF, the target base station derives KgNB* based on the received NH in step 407. In a specific implementation, the target base station may derive KgNB* based on a target PCI, a target cell ARFCN-DL, and an NH.

Optionally, the target base station may derive a plurality of keys KgNB* that are in a one-to-one correspondence with a plurality of cells of the target base station.

Step 408. The target base station sends an RRC container to the target AMF.

The RRC container includes an RRC connection reconfiguration message, and the message includes an NCC and a keychangeindicator. The NCC is the received NCC in step 406. The keychangeindicator is generated by the target base station based on the received NSCI.

Step 409. The target AMF sends a create terminal context response message to the source AMF, where the message includes the RRC container.

In an implementation, the create terminal context response message may be an Namf_Communication_CreateUEContext Response message.

Step 410. The source AMF sends the handover request message to the source base station, where the message includes the RRC container.

Step 411. The source base station sends the RRC container to the terminal. The RRC container includes the RRC reconfiguration (RRCReconfiguration) message.

Step 412. Derive KgNB based on Kamf.

If the terminal determines, based on the received keychangeindicator, that KgNB needs to be derived, the terminal derives KgNB based on Kamf, and sets an NCC corresponding to KgNB to 0.

Step 413. The terminal compares the received NCC with a current NCC of the terminal. Because values of the two NCCs are both 0, the two NCCs are equal, and the terminal derives KgNB* based on KgNB.

It should be noted that, if step 405 and step 406 are implemented by the alternative manner thereof, step 412 and step 413 are replaced with the following implementation: The terminal determines, based on the keychangeindicator, that KgNB needs to be derived, and sets the NCC corresponding to KgNB to 0. The terminal first determines whether the current NCC of the terminal is the same as the NCC received by the terminal. In this case, a determining result should be that the current NCC of the terminal is not the same as the NCC received by the terminal, and the terminal derives a next-layer NH based on Kamf* and the current NH, and then adds 1 to the current NCC of the terminal. Then, the terminal continues to determine whether the current NCC of the terminal is the same as the NCC received by the terminal, until the current NCC of the terminal is the same as the NCC received by the terminal. In this case, the terminal derives KgNB* based on the current NH. In a specific implementation, the terminal may derive KgNB* based on the target cell PCI, the target cell ARFCN-DL, and the current NH.

Descriptions are provided by using examples below with reference to FIG. 5. In an example, if the current NCC of the terminal is equal to 0, and the NCC received by the terminal is 1, the terminal first derives the NH based on Kamf and the current KgNB, adds 1 to the current NCC of the terminal to obtain the NCC=1, and then derives KgNB* based on the NH of the terminal.

Referring to FIG. 5, the foregoing derivation process may be understood as follows: The terminal first performs longitudinal derivation on the NH and adds 1 to the NCC of the terminal, until the NCC of the terminal is equal to the NCC received by the terminal, and then the terminal performs horizontal derivation based on a newest NH through derivation, to obtain KgNB*.

Step 414. The terminal sends an RRC reconfiguration complete message to the target base station.

In the foregoing handover procedure of the terminal, a terminal side derives KgNB* based on original Kamf. A target base station side derives KgNB*, so that keys (KgNB*) are synchronized between the terminal and the target base station.

In the foregoing procedure, handover procedure failures are as follows: For example, a handover failure occurs because the RRC reconfiguration complete message in step 414 is not received by a network side (for example, the terminal starts a timer before step 414, and the terminal does not receive an ACK message from the base station before the timer expires, which indicates that the terminal fails to send the RRC reconfiguration complete message), or the RRC reconfiguration message in the RRC container received by the terminal in step 411 causes a terminal reconfiguration failure (for example, after step 411, the terminal performs configuration based on a configuration parameter in the RRC reconfiguration message, and the configuration fails) due to a configuration parameter error or the like. In these cases, a key that has been derived by the terminal is not activated due to a failure. Therefore, a previous key is used in a subsequent RRC procedure. For example, a key used by the terminal is rolled back to KgNB2 (herein, KgNB2 is derived based on Kamf1).

Figure 6:
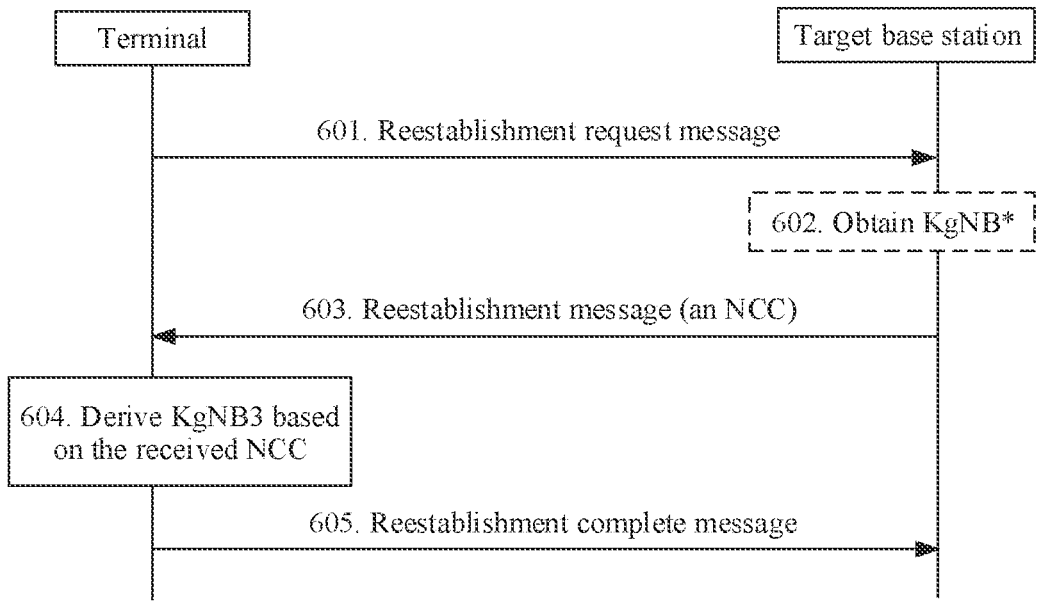
FIG. 6 is a schematic diagram of a reestablishment procedure of a terminal in the conventional technology.
Figure 7:
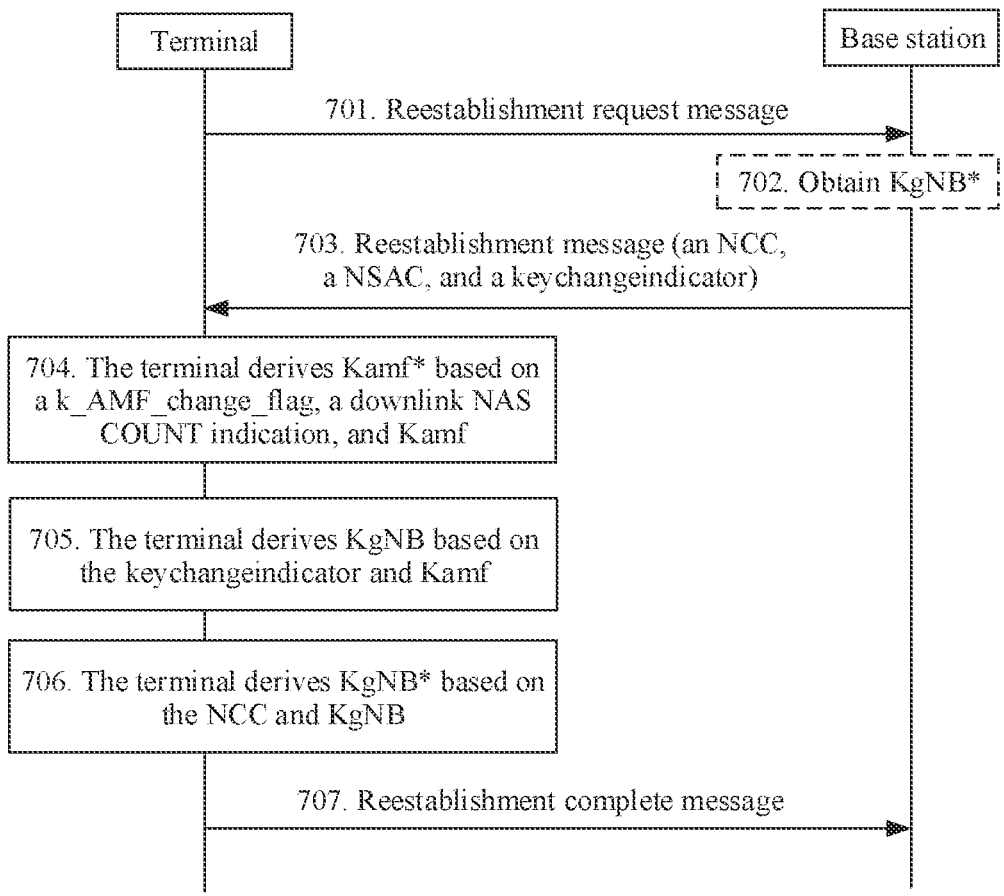
FIG. 7 is a schematic diagram of a reestablishment procedure of a terminal according to this application.
Figure 8:
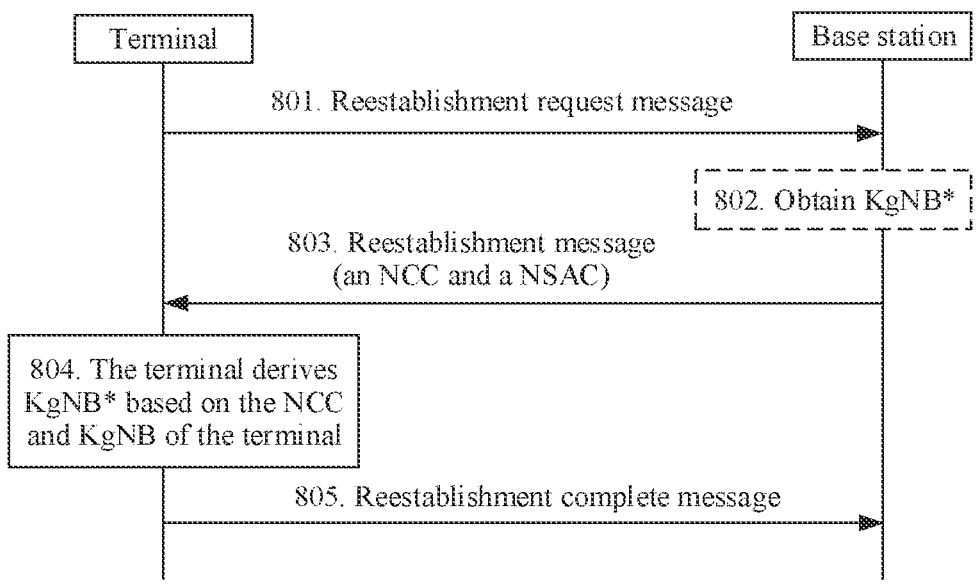
FIG. 8 is another schematic diagram of a reestablishment procedure of a terminal according to this application.
Figure 9:
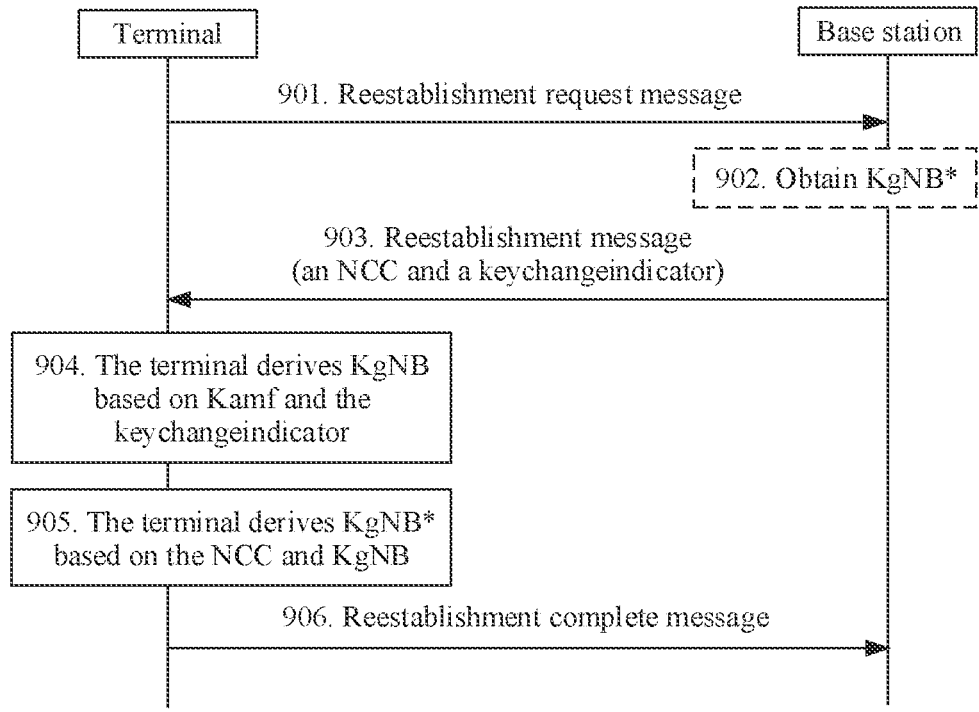
FIG. 9 is another schematic diagram of a reestablishment procedure of a terminal according to this application.

For the foregoing three cases shown in FIG. 2A to FIG. 4, when the terminal determines that the handover procedure fails, the terminal initiates a reestablishment procedure, as shown in each of FIG. 7 to FIG. 9. FIG. 6 is a schematic diagram of a reestablishment procedure of a terminal in 5G in the conventional technology. The reestablishment procedure is the same as a reestablishment procedure in 4G. In addition, this application is specific to a case in which a cell reselected by the terminal is a cell of the target base station in the foregoing handover procedure. After the handover procedure fails, a key on the terminal is not consistent with a key on the target base station. Therefore, in the reestablishment procedure, the keys of the terminal and the target base station need to be updated, so that the key of the terminal is consistent with the key of the target base station.

The procedure includes the following steps.

Step 601. The terminal sends a reestablishment request message to the target base station.

Optionally, the reestablishment request message includes an identity authentication parameter.

Step 602. The target base station obtains KgNB*.

Optionally, when the reestablishment request message includes the identity authentication parameter, the target base station further authenticates the terminal based on the identity authentication parameter.

If the target base station generates corresponding KgNB* for a current cell in step 208 (or step 307, or step 407), the target base station obtains, based on the identity authentication parameter, a security context corresponding to the terminal, and obtains corresponding KgNB*.

If the target base station does not generate corresponding KgNB* for the current cell in step 208 (or step 307, or step 407), the target base station derives KgNB* depending on whether there is an NH that is not successfully used in a current context. If there is an NH that is not successfully used in the current context, the target base station derives KgNB* based on the NH. Otherwise, KgNB* is derived based on current KgNB.

Optionally, the target base station derives KgNB* based on a target PCI, a target cell ARFCN-DL, and KgNB. Alternatively, the target base station derives KgNB* based on a target PCI, a target cell ARFCN-DL, and an NH.

Step 602 is an optional step.

Step 603. The target base station sends a reestablishment message to the terminal, where the message includes an NCC.

In this step, the NCC is carried in the reestablishment message sent by target base station to the terminal. The NCC is the corresponding NCC in step 602.

Step 604. The terminal derives KgNB3 based on the received NCC.

Step 605. The terminal sends a reestablishment complete message to the base station.

Therefore, currently, in the reestablishment procedure in 5G shown in FIG. 6, the NCC is sent to the terminal by using the reestablishment message in step 603. Consequently, there is a problem in a manner in which the terminal updates a key. Specifically, in the foregoing procedure, a key of the terminal is not consistent with a key of the base station.

A main cause of the reestablishment procedure failure shown in FIG. 6 is that the reestablishment message in step 603 carries only the NCC parameter, which is insufficient. However, currently, in 5G, only the NCC is carried in the reestablishment message because the reestablishment procedure in 4th generation (4G) communications is still used. In the reestablishment procedure in 4G, only the NCC is carried in the reestablishment message because, for an existing S1 handover in 4G, a mobility management entity (MME) does not introduce a feature of key isolation, and Kasme does not change. If the MME performs algorithm reselection, the MME performs algorithm reselection after the S1 handover is completed, instead of performing algorithm reselection in the handover procedure. In addition, if an access stratum key and a root key are not synchronized, the problem that the access stratum key and the root key are not synchronized is not resolved in an explicit procedure in 4G. Instead, an implicit constraint is used to resolve the problem. In other words, in 4G, only the NCC is carried in the reestablishment message, so that keys between the terminal and the target base station can be consistent. However, in 5G, due to security improvement, the key isolation needs to be performed during an AMF handover, and a new algorithm or a synchronous access stratum key can be selected in the handover procedure. Therefore, a NASC and a keychangeindicator appear. As a result, thereby it is insufficient to send only the NCC in the reestablishment message, and the keys are inconsistent.

Therefore, in the reestablishment procedure in the conventional technology shown in FIG. 6, the key of the terminal is not consistent with the key of the base station. To resolve the problem, this application provides a wireless communication method. The wireless communication method includes a reestablishment procedure of a terminal, and optionally further includes a handover procedure of the terminal. The wireless communication method provided in this application can be used to resolve the problem existing in the reestablishment procedure shown in FIG. 6.

In the reestablishment procedure provided in this application, in addition to the NCC, the reestablishment message in step 603 further carries key derivation information. The key derivation information includes different specific parameters according to different situations.

For example, if the handover procedure of the terminal is the handover procedure shown in FIG. 2A and FIG. 2B, the key derivation information includes the NASC and the keychangeindicator, where the NASC may include a k_AMF_change_flag, a downlink NAS_COUNT indication, an identifier of a selected algorithm, a NAS MAC, and the like, and the keychangeindicator is used to indicate to update the access stratum key.

For another example, if the handover procedure of the terminal is the handover procedure shown in FIG. 3, the key derivation information includes the NASC, where the NASC may include an identifier of a selected algorithm, a NAS MAC, and the like.

For another example, if the handover procedure of the terminal is the handover procedure shown in FIG. 4, the key derivation information includes the keychangeindicator, where the keychangeindicator is used to indicate to update the access stratum key.

In other words, a parameter carried in the reestablishment message in this application is the same as a parameter carried in an RRC reconfiguration message in the handover procedure. If the RRC reconfiguration message carries the NCC, the NASC, and the keychangeindicator, the reestablishment message in the reestablishment procedure also carries the NCC, the NASC, and the keychangeindicator. If the RRC reconfiguration message carries the NCC and NASC, the reestablishment message in the reestablishment procedure also carries the NCC and the NASC. If the RRC reconfiguration message carries the NCC and the keychangeindicator, the reestablishment message in the reestablishment procedure also carries the NCC and the keychangeindicator.

Different cases shown in FIG. 2A to FIG. 4 are respectively described in detail below with reference to FIG. 7 to FIG. 9.

FIG. 7 is a schematic diagram of a reestablishment procedure according to this application. The reestablishment procedure shown in FIG. 7 is the handover procedure shown in FIG. 2A and FIG. 2B. The reestablishment procedure shown in FIG. 7 may be performed after step 217 in FIG. 2B after a handover failure occurs in the handover procedure in FIG. 2A and FIG. 2B. Alternatively, the reestablishment procedure shown in FIG. 7 may be performed after step 212 in FIG. 2B after a reconfiguration failure occurs in the handover procedure in FIG. 2A and FIG. 2B.

The reestablishment procedure includes the following steps.

Step 701 and step 702 are the same as step 601 and step 602 shown in FIG. 6. Refer to the foregoing descriptions.

Step 703. A base station sends a reestablishment message to the terminal, where the reestablishment message includes an NCC, a NASC, and a keychangeindicator.

The base station is a target base station to which the terminal is to be handed over in the handover procedure. It should be noted that the terminal may be reestablished in a same cell of the target base station, or may be reestablished in different cells of the target base station. For example, the target base station that is handed over to in FIG. 2A and FIG. 2B includes a cell A, a cell B, and a cell C, and in the handover procedure in FIG. 2A and FIG. 2B, a cell to which the terminal needs to be handed over is the cell A of the target base station. Therefore, in the reestablishment procedure shown in FIG. 7, the terminal may be reestablished in the cell A of the target base station, that is, may be reestablished in a same cell of the target base station, or may be reestablished in the cell B or the cell C of the target base station, that is, may be reestablished in different cells of the target base station.

The NASC includes a k_AMF_change_flag and a downlink NAS COUNT indication, and the k_AMF_change_flag is used to indicate to update a root key. Further, the NASC may further include an identifier of a selected algorithm, a NAS MAC, and the like. The downlink NAS COUNT indication is used to indicate all or some bits of a downlink NAS COUNT.

The keychangeindicator is used to indicate to update an access stratum key.

The NASC is obtained by the base station from the target AMF in step 207 in FIG. 2A. The keychangeindicator is generated by the base station based on the NSCI sent by the target AMF in step 207 in FIG. 2A. Usually, the base station directly constructs an RRC container, and the RRC container includes a NASC and a keychangeindicator. After sending the RRC container, the base station does not need to store the NASC and the keychangeindicator. However, because an out-of-synchronization problem of a security context in reestablishment needs to be resolved, the base station needs to temporarily store the NASC and the keychangeindicator, or the base station temporarily stores the NASC and the NSCI, until the handover procedure is successfully completed, that is, an RRC reconfiguration message is successfully received. Information stored by the base station may be referred to as an intermediate parameter. Specifically, the stored intermediate parameter may be the NASC and the keychangeindicator, or may be the NASC and the NSCI. It may also be understood that, in a handover preparation process, the base station obtains the NSCI and the NASC from the target AMF, the base station determines the keychangeindicator based on the NSCI, and then the base station buffers the NASC and the keychangeindicator, or buffers the NASC and the NSCI. The handover preparation process refers to a context transmission process before a network side sends the RRC reconfiguration message to the terminal, and may include exchange of messages such as a handover required, a handover request, a create terminal context request, and a create terminal context response. Unified descriptions are provided herein, and details are not described again in other embodiments subsequently.

When the base station temporarily stores the NASC and the keychangeindicator, before sending the reestablishment message to the terminal, the base station first obtains the buffered NASC and the buffered keychangeindicator, and then sends a reestablishment request message to the terminal, where the reestablishment request message includes the NCC, the NASC, and the keychangeindicator.

When the base station temporarily stores the NASC and the NSCI, before sending the reestablishment message to the terminal, the base station obtains the NASC and the NSCI, and then determines the keychangeindicator based on the NSCI, and sends the reestablishment message to the terminal, where the reestablishment message includes the NCC, the NASC, and the keychangeindicator.

Optionally, after successfully completing the handover, the base station deletes the buffered intermediate parameter.

Step 704. The terminal derives a second root key (Kamf*) based on the k_AMF_change_flag, the downlink NAS COUNT indication, and a first root key (Kamf) of the terminal.

Specifically, in an implementation, if the terminal receives the k_AMF_change_flag, the terminal determines that a root key of the terminal needs to be updated. In another implementation, if the terminal receives the k_AMF_change_flag, and a value of the k_AMF_change_flag is "1" or "true", the terminal determines that a root key of the terminal needs to be updated.

After determining that the root key of the terminal needs to be updated, the terminal obtains a second downlink NAS COUNT based on the downlink NAS COUNT indication and a first downlink NAS COUNT of the terminal, and then the terminal derives Kamf* based on the second downlink NAS COUNT and Kamf.

Further, after deriving Kamf*, the terminal may further derive Knas based on Kamf* of the terminal, and then the terminal checks a NAS MAC in the received NASC based on the selected algorithm in the NASC, the downlink NAS COUNT indication, and Knas. A specific check method is the same as a check method in the procedure shown in FIG. 2A and FIG. 2B. Refer to the foregoing descriptions.

Step 705. The terminal derives KgNB of the terminal based on the keychangeindicator and Kamf*.

Specifically, in an implementation, if the terminal receives the keychangeindicator, the terminal determines that the access stratum key of the terminal needs to be updated. In another implementation, if the terminal receives the keychangeindicator, and a value of the k_AMF_change_flag is "1" or "true", the terminal determines that the access stratum key of the terminal needs to be updated.

After determining that the access stratum key of the terminal needs to be updated, the terminal derives a first access stratum key (KgNB) of the terminal based on Kamf*.

Step 706. The terminal derives a second access stratum key (KgNB*) of the terminal based on the NCC and KgNB of the terminal.

It should be noted that step 706 may also be performed in the following manner: It should be noted that, if step 206 and step 207 in the handover procedure shown in FIG. 2A are implemented by the alternative manner thereof, step 706 and step 707 are replaced with the following implementation: The terminal determines, based on the keychangeindicator, that KgNB needs to be derived, and sets an NCC corresponding to KgNB to 0. The terminal first determines whether the current NCC of the terminal is the same as the NCC received by the terminal. In this case, a determining result should be that the current NCC of the terminal is not the same as the NCC received by the terminal, and the terminal derives a next-layer NH based on Kamf* and a current NH, and then adds 1 to the current NCC of the terminal. Then, the terminal continues to determine whether the current NCC of the terminal is the same as the NCC received by the terminal, until the current NCC of the terminal is the same as the NCC received by the terminal. In this case, the terminal derives KgNB* based on the current NH. In a specific implementation, the terminal may derive KgNB* based on the target cell PCI, the target cell ARFCN-DL, and the current NH.

Step 707. The terminal sends a reestablishment complete message to the base station. The reestablishment complete message is protected by using a key derived based on the second access stratum key (KgNB*) of the terminal.

The "key derived based on KgNB* of the terminal" includes an integrity key and an encryption key. "Protection" includes integrity protection and encrypted protection. Specifically, encrypted protection is performed on user plane/signaling plane data by using an encryption key and an encryption algorithm. Integrity protection is performed on the user plane/signaling plane data by using an integrity protection key and an integrity protection algorithm. A sequential relationship between the encrypted protection and the integrity protection is not limited in the embodiments of the present invention. To be specific, the encrypted protection may be first performed on the user plane/signaling plane data, and then the integrity protection is performed. Alternatively, the integrity protection may be first performed on a user plane/signaling plane data, and then the encrypted protection is performed on the user plane/signaling plane data. Certainly, a same execution sequence may not be used for the user plane and the signaling plane data.

For example, the terminal uses the second access stratum key as a current access stratum key, derives an RRC key based on the current access stratum key, and protects the reestablishment complete message based on the RRC key.

Based on the solution in FIG. 7, when the handover procedure of the terminal fails, the terminal initiates the reestablishment procedure. When a base station reselected by the terminal is a base station (that is, the target base station) to which the terminal is handed over in the handover procedure, because a key of the base station is updated in the handover procedure, and the intermediate parameter is stored (for example, the NASC and the keychangeindicator are stored, or the NASC and the NSCI are stored), the base station includes the key derivation information in the reestablishment message to be sent to the terminal. Therefore, the terminal can update the key of the terminal based on the key derivation information, so that the key of the terminal can be consistent with a key on the network side.

FIG. 8 is a schematic diagram of a reestablishment procedure according to this application. The reestablishment procedure shown in FIG. 8 is the handover procedure shown in FIG. 3. The reestablishment procedure shown in FIG. 8 may be performed after step 314 in FIG. 3 after a handover failure occurs in the handover procedure in FIG. 3. Alternatively, the reestablishment procedure shown in FIG. 7 may be performed after step 311 in FIG. 3 after a reconfiguration failure occurs in the handover procedure in FIG. 3.

The reestablishment procedure includes the following steps.

Step 801 and step 802 are the same as step 601 and step 602 shown in FIG. 6. Refer to the foregoing descriptions.

Step 803. A base station sends a reestablishment message to the terminal, where the reestablishment message includes an NCC and a NASC.

The base station is a target base station to which the terminal is to be handed over in the handover procedure. It should be noted that the terminal may be reestablished in a same cell of the target base station, or may be reestablished in different cells of the target base station. For example, the target base station that is handed over to in FIG. 3 includes a cell A, a cell B, and a cell C, and in the handover procedure in FIG. 3, a cell to which the terminal needs to be handed over is the cell A of the target base station. Therefore, in the reestablishment procedure shown in FIG. 8, the terminal may be reestablished in the cell A of the target base station, that is, may be reestablished in a same cell of the target base station, or may be reestablished in the cell B or the cell C of the target base station, that is, may be reestablished in different cells of the target base station.

The NASC includes a downlink NAS COUNT indication, a selected algorithm, a NAS MAC, and the like. The downlink NAS COUNT indication is used to indicate all or some bits of a downlink NAS COUNT.

Further, after receiving the reestablishment message, the terminal may derive Knas based on Kamf of the terminal, and then the terminal checks a NAS MAC in the received NASC based on the selected algorithm in the NASC, the downlink NAS COUNT indication, and Knas. A specific check method is the same as a check method in the procedure shown in FIG. 3. Refer to the foregoing description.

The NASC is obtained by the base station from the target AMF in step 306 in FIG. 3. Usually, the base station directly constructs an RRC container, and the RRC container includes the NASC. After sending the RRC container, the base station does not need to store the NASC. However, because an out-of-synchronization problem of a security context in reestablishment needs to be resolved, the base station needs to temporarily store the NASC, or the base station temporarily stores the NASC, until the handover procedure is successfully completed, that is, an RRC reconfiguration message is successfully received. Information stored by the base station may be referred to as an intermediate parameter. Specifically, the stored intermediate parameter may be the NASC. It may also be understood that, in a handover preparation process, the base station obtains the NASC from the target AMF, and then the base station buffers the NASC.

When the base station temporarily stores the NASC, before sending the reestablishment message to the terminal, the base station first obtains the buffered NASC, and then sends the reestablishment message to the terminal, where the reestablishment message includes the NCC and the NASC.

Step 804. The terminal derives a second access stratum key (KgNB*) of the terminal based on the NCC and KgNB of the terminal.

Optionally, after successfully completing the handover, the base station deletes the buffered intermediate parameter.

Step 805. The terminal sends a reestablishment complete message to the base station. The reestablishment complete message is protected by using a key derived based on the second access stratum key (KgNB*) of the terminal.

The "key derived based on KgNB* of the terminal" includes an integrity key and an encryption key. "Protection" includes integrity protection and encrypted protection. Specifically, encrypted protection is performed on user plane/signaling plane data by using an encryption key and an encryption algorithm. Integrity protection is performed on the user plane/signaling plane data by using an integrity protection key and an integrity protection algorithm. A sequential relationship between the encrypted protection and the integrity protection is not limited in the embodiments of the present invention. To be specific, the encrypted protection may be first performed on the user plane/signaling plane data, and then the integrity protection is performed. Alternatively, the integrity protection may be first performed on a user plane/signaling plane, and then the encrypted protection is performed on the user plane/signaling plane data. Certainly, a same execution sequence may not be used for the user plane and the signaling plane.

For example, the terminal uses the second access stratum key as a current access stratum key, derives an RRC key based on the current access stratum key, and protects the reestablishment complete message based on the RRC key.

Based on the solution in FIG. 8, when the handover procedure of the terminal fails, the terminal initiates the reestablishment procedure. When a base station reselected by the terminal is a base station (that is, the target base station) to which the terminal is handed over in the handover procedure, because a key of the base station is updated in the handover procedure, and the intermediate parameter is stored (for example, the NASC is stored), the base station includes the key derivation information in the reestablishment message to be sent to the terminal. Therefore, the terminal can update the key of the terminal based on the key derivation information, so that the key of the terminal can be consistent with a key on a network side.

FIG. 9 is a schematic diagram of a reestablishment procedure according to this application. The reestablishment procedure shown in FIG. 9 is the handover procedure shown in FIG. 4. The reestablishment procedure shown in FIG. 9 may be performed after step 414 in FIG. 4 after a handover failure occurs in the handover procedure in FIG. 4. Alternatively, the reestablishment procedure shown in FIG. 9 may be performed after step 411 in FIG. 4 after a reconfiguration failure occurs in the handover procedure in FIG. 4.

The reestablishment procedure includes the following steps.

Step 901 and step 902 are the same as step 601 and step 602 shown in FIG. 9. Refer to the foregoing descriptions.

Step 903. A base station sends a reestablishment message to the terminal, where the reestablishment message includes an NCC and a keychangeindicator.

The base station is a target base station to which the terminal is to be handed over in the handover procedure. It should be noted that the terminal may be reestablished in a same cell of the target base station, or may be reestablished in different cells of the target base station. For example, the target base station that is handed over to in FIG. 4 includes a cell A, a cell B, and a cell C, and in the handover procedure in FIG. 4, a cell to which the terminal needs to be handed over is the cell A of the target base station. Therefore, in the reestablishment procedure shown in FIG. 9, the terminal may be reestablished in the cell A of the target base station, that is, may be reestablished in a same cell of the target base station, or may be reestablished in the cell B or the cell C of the target base station, that is, may be reestablished in different cells of the target base station.

The keychangeindicator is used to indicate to update an access stratum key.

The keychangeindicator is generated by the target base station in step 406 in FIG. 4 based on the NSCI sent by the target AMF. Usually, after sending the keychangeindicator, the target base station does not need to store the keychangeindicator. However, because an out-of-synchronization problem of a security context in reestablishment needs to be resolved, the target base station needs to temporarily store the keychangeindicator, or the base station temporarily stores the NSCI, until the handover procedure is successfully completed, that is, an RRC reconfiguration message is successfully received. Information stored by the base station may be referred to as an intermediate parameter. Specifically, the stored intermediate parameter may be the keychangeindicator or the NSCI. It may also be understood that, in a handover preparation process, the base station obtains the NSCI from the target AMF, the base station determines the keychangeindicator based on the NSCI, and then the base station buffers the keychangeindicator or buffers the NSCI.

When the base station temporarily stores the keychangeindicator, before sending the reestablishment message to the terminal, the base station first obtains the buffered keychangeindicator, and then sends a reestablishment request message to the terminal, where the reestablishment request message includes the NCC and the keychangeindicator.

When the base station temporarily stores the NSCI, before sending the reestablishment message to the terminal, the base station obtains the NSCI, and then determines the keychangeindicator based on the NSCI, and sends the reestablishment message to the terminal, where the reestablishment message includes the NCC and the keychangeindicator.

Optionally, after successfully completing the handover, the base station deletes the buffered intermediate parameter.

Step 904. The terminal derives KgNB of the terminal based on Kamf and the keychangeindicator.

Specifically, in an implementation, if the terminal receives the keychangeindicator, the terminal determines that the access stratum key of the terminal needs to be updated. In another implementation, if the terminal receives the keychangeindicator, and a value of a k_AMF_change_flag is "1" or "true", the terminal determines that the access stratum key of the terminal needs to be updated.

After determining that the access stratum key of the terminal needs to be updated, the terminal derives a first access stratum key (KgNB) of the terminal based on Kamf.

Step 905. The terminal derives a second access stratum key (KgNB*) of the terminal based on the NCC and KgNB of the terminal.

For a specific implementation of this step, refer to step 413 in the handover procedure shown in FIG. 4. Step 906. The terminal sends a reestablishment complete message to the base station. The reestablishment complete message is protected by using a key derived based on the second access stratum key (KgNB*) of the terminal.

The "key derived based on KgNB* of the terminal" includes an integrity key and an encryption key. "Protection" includes integrity protection and encrypted protection. Specifically, encrypted protection is performed on user plane/signaling plane data by using an encryption key and an encryption algorithm. Integrity protection is performed on the user plane/signaling plane data by using an integrity protection key and an integrity protection algorithm. A sequential relationship between the encrypted protection and the integrity protection is not limited in the embodiments of the present invention. To be specific, the encrypted protection may be first performed on the user plane/signaling plane data, and then the integrity protection is performed. Alternatively, the integrity protection may be first performed on a user plane/signaling plane, and then the encrypted protection is performed on the user plane/signaling plane data. Certainly, a same execution sequence may not be used for the user plane and the signaling plane.

For example, the terminal uses the second access stratum key as a current access stratum key, derives an RRC key based on the current access stratum key, and protects the reestablishment complete message based on the RRC key. Based on the solution in FIG. 9, when the handover procedure of the terminal fails, the terminal initiates the reestablishment procedure. When a base station reselected by the terminal is a base station (that is, the target base station) to which the terminal is handed over in the handover procedure, because a key of the base station is updated in the handover procedure, and the intermediate parameter is stored (for example, the keychangeindicator is stored, or the NSCI is stored), the base station includes the key derivation information in the reestablishment message to be sent to the terminal. Therefore, the terminal can update the key of the terminal based on the key derivation information, so that the key of the terminal can be consistent with the key of the network side.

With reference to any one of the foregoing embodiments, if the NASC needs to be sent to the terminal in the embodiments, in a specific implementation process, the NASC includes a downlink NAS COUNT indication, a selected algorithm, a first NAS MAC, and the like. The downlink NAS COUNT indication may include some or all bits of the downlink NAS COUNT, and the first NAS MAC includes some or all bits of a second NAS MAC. The second NAS MAC refers to a NAS MAC calculated by the base station.

In specific implementation, at least the following implementations are included.

Implementation 1: The downlink NAS COUNT indication includes all the bits of the downlink NAS COUNT, and the first NAS MAC includes all the bits of the second NAS MAC.

In an example, the NASC includes the following parameters: a downlink NAS COUNT of 32 bits, ngKSI of 4 bits, and a selected algorithm (selected NAS security algorithms) of 6 bits, and a second NAS MAC of 32 bits, where there are 74 bits in total.

In this example, the downlink NAS COUNT indication included in the NASC that is sent to the terminal is of 32 bits, the second NAS MAC is of 32 bits, the selected algorithm is of 6 bits, and ngKSI is of 4 bits.

Based on this implementation, after receiving the NASC, the terminal obtains parameters such as the downlink NAS COUNT indication and the first NAS MAC in the NASC, generates a NAS MAC based on Knas, the selected algorithm, and the downlink NAS COUNT indication, and then checks the first NAS MAC of the NASC based on the generated NAS MAC.

Implementation 2: The downlink NAS COUNT indication includes some bits (for example, low L1 bits) of the downlink NAS COUNT, and the first NAS MAC includes all the bits of the second NAS MAC, where L1 is a positive integer.

In this implementation, the downlink NAS COUNT is truncated, and the second NAS MAC is not truncated.

Still using the example in Implementation 1, L1 is preset to 5, that is, low 5 bits of the downlink NAS COUNT are obtained through truncation. In this case, the downlink NAS COUNT indication included in the NASC that is sent to the terminal is of 5 bits, the first NAS MAC is of 32 bits, the selected algorithm is of 6 bits, and ngKSI is of 4 bits.

Based on this implementation, after receiving the NASC, the terminal obtains parameters such as the downlink NAS COUNT indication and the first NAS MAC in the NASC, and obtains the second downlink NAS COUNT based on the first downlink NAS COUNT of the terminal and the downlink NAS COUNT indication. Then, the NAS MAC is generated based on Knas, the selected algorithm, and the second downlink NAS COUNT. The terminal checks the first NAS MAC of the NASC based on the generated NAS MAC.

Implementation 3: The downlink NAS COUNT indication includes some bits (for example, low L2 bits) of the downlink NAS COUNT, the first NAS MAC includes some bits (for example, low L3 bits or high L4 bits) of the second NAS MAC, where L2 is a positive integer, L3 is a positive integer, and L4 is a positive integer.

In this implementation, both the downlink NAS COUNT and the second NAS MAC are truncated.

In an example, still using the example in Implementation 1, if L2 is preset to 8, the first NAS MAC includes low L3 bits of the second NAS MAC, and L3 is preset to 16, that is, low 8 bits of the downlink NAS COUNT are obtained through truncation, and low 16 bits of the second NAS MAC are obtained through truncation, the downlink NAS COUNT indication included in the NASC that is sent to the terminal is of 8 bits, the first NAS MAC is of 16 bits, the selected algorithm is of 6 bits, and ngKSI is of 4 bits.

In another example, still using the example in Implementation 1, if L2 is preset to 8, the first NAS MAC includes high L4 bits of the second NAS MAC, and L4 is preset to 16, that is, low 8 bits of the downlink NAS COUNT are obtained through truncation, and high 16 bits of the second NAS MAC are obtained through truncation, the downlink NAS COUNT indication included in the NASC that is sent to the terminal is of 8 bits, the first NAS MAC is of 16 bits, the selected algorithm is of 6 bits, and ngKSI is of 4 bits.

Based on this implementation, after receiving the NASC, the terminal obtains the second downlink NAS COUNT based on the first downlink NAS COUNT of the terminal and the downlink NAS COUNT indication. The terminal generates the NAS MAC based on Knas, the selected algorithm, and the second downlink NAS COUNT. The terminal checks the first NAS MAC of the NASC based on low 16 bits or high 16 bits of the generated NAS MAC.

Implementation 4: The downlink NAS COUNT indication includes all the bits of the downlink NAS COUNT, and the first NAS MAC includes some bits (for example, low L5 bits) of the second NAS MAC.

In this implementation, the second NAS MAC is truncated. For example, the target base station truncates the NASC.

The example in Implementation 1 is still used, and L5 is preset to 6. When sending the reestablishment message, the target base station directly truncates the first 48 bits of the NASC of 74 bits based on a left-most manner. In this case, the second NAS MAC has only 6 bits remaining. The target base station sends the reestablishment message to the terminal, where the message includes a truncated NASC, the downlink NAS COUNT indication included in the NASC is of 32 bits, the first NAS MAC is of 6 bits, the selected algorithm is of 6 bits, and ngKSI is of 4 bits.

Based on this implementation, after receiving the NASC, the terminal generates the NAS MAC based on Knas, the selected algorithm, and the downlink NAS COUNT indication of the NASC, and then checks the first NAS MAC of the NASC based on low 6 bits of the generated NAS MAC.

Figure 10:
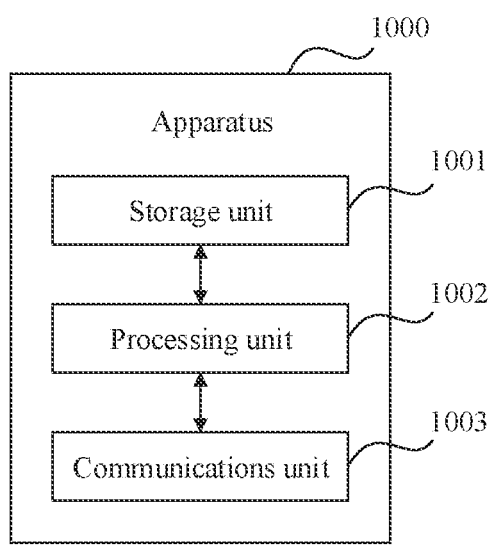
FIG. 10 is a schematic diagram of an apparatus according to this application.

When an integrated unit is used, FIG. 10 is a possible example block diagram of an apparatus 1000 according to an embodiment of the present invention. The apparatus 1000 may exist in a form of software. The apparatus 1000 may include a processing unit 1002 and a communications unit 1003. In an implementation, the communications unit 1003 may include a receiving unit and a sending unit. The processing unit 1002 is configured to control and manage an action of the apparatus 1000. The communications unit 1003 is configured to support the apparatus 1000 in communicating with another network entity. The apparatus 1000 may further include a storage unit 1001, configured to store program code and data of the apparatus 1000.

The processing unit 1002 may be a processor or a controller, for example, a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processing unit 1002 may implement or execute various example logical blocks, modules, and circuits described with reference to content disclosed in the present invention. The processing unit 1002 may be a combination of processors implementing a computing function, for example, a combination including one or more microprocessors, or a combination of the DSP and a microprocessor. The communications unit 1003 may be a communications interface, a transceiver, a transceiver circuit, or the like, where the communications interface is a general name, and may include a plurality of interfaces during specific implementation. The storage unit 1001 may be a memory.

In a first application, the apparatus 1000 may be the base station in any one of the foregoing embodiments, or may be a chip in the base station. For example, when the apparatus 1000 is the base station, the processing unit may be, for example, a processor. The communications unit may be, for example, a transceiver, and the transceiver includes a radio frequency circuit. Optionally, the storage unit may be, for example, a memory. For example, when the apparatus 1000 is the chip in the base station, the processing unit may be, for example, a processor, and the communications unit may be, for example, an input/output interface, a pin, or a circuit. The processing unit may execute a computer executable instruction stored in the storage unit. Optionally, the storage unit is a storage unit inside the chip, such as a register or a cache. Alternatively, the storage unit may be a storage unit that is in an access network device and that is located outside the chip, such as a read-only memory (ROM) or another type of static storage device that can store static information and an instruction, or a random access memory (RAM).

Specifically, when the communications unit 1003 includes the sending unit and the receiving unit, the receiving unit is configured to receive a reestablishment request message from a terminal, where the reestablishment request message is used to reestablish an RRC connection. The sending unit is configured to send a reestablishment message to the terminal, where the reestablishment message includes a next hop chaining counter NCC and key derivation information, and the key derivation information is used to indicate the terminal to derive an access stratum key. The receiving unit is further configured to receive a reestablishment complete message from the terminal, where the reestablishment complete message is protected by using a key derived based on the access stratum key.

In a possible implementation, the key derivation information includes a first indication and a non-access stratum container NASC, the NASC includes a second indication and a downlink NAS COUNT indication, the first indication is used to indicate to update the access stratum key, and the second indication is used to indicate to update a root key.

In a possible implementation, the NASC further includes a first NAS MAC and an identifier of a selected algorithm.

In a possible implementation, the key derivation information includes a first indication, and the first indication is used to indicate to update the access stratum key.

In a possible implementation, the processing unit is configured to: before the sending unit sends the reestablishment message to the terminal, determine the first indication based on a buffered intermediate parameter, where the intermediate parameter is a new security context indicator NSCI obtained by the apparatus from an access and mobility management function entity in a handover preparation process, and the NSCI is used to indicate the apparatus to update the access stratum key.

In a possible implementation, the receiving unit is further configured to: before receiving the reestablishment request message from the terminal, obtain a new security context indicator NSCI from an access and mobility management function entity in a handover preparation process, where the NSCI is used to indicate the base station to update the access stratum key.

The processing unit is configured to: determine and store the first indication based on the NSCI, and obtain the stored first indication before the sending unit sends the reestablishment message to the terminal.

In a possible implementation, the receiving unit is further configured to: before receiving the reestablishment request message from the terminal, obtain the NASC from an access and mobility management function entity in a handover preparation process; and the processing unit is configured to: store the NASC; and obtain the stored NASC before the sending unit sends the reestablishment message to the terminal.

In a possible implementation, the sending unit is further configured to: before the receiving unit receives the reestablishment request message from the terminal, send an RRC reconfiguration message to the terminal, where the RRC reconfiguration message includes a configuration parameter, the NCC, and the key derivation information.

In second application, the apparatus 1000 may be the terminal in any one of the foregoing embodiments, or may be a chip in the terminal. For example, when the apparatus 1000 may be the terminal, the processing unit may be, for example, a processor. The communications unit may be, for example, a transceiver, and the transceiver includes a radio frequency circuit. Optionally, the storage unit may be, for example, a memory. For example, when the apparatus 1000 may be the chip in the terminal, the processing unit may be, for example, a processor, and the communications unit may be, for example, an input/output interface, a pin, or a circuit. Optionally, the storage unit is a storage unit inside the chip, such as a register or a cache. Alternatively, the storage unit may be a storage unit that is inside the terminal and that is located outside the chip, such as a ROM, another type of static storage device that can store static information and an instruction, or a RAM.

Specifically, when the communications unit 1003 includes a sending unit and a receiving unit, the sending unit is configured to send a reestablishment request message to a base station, where the reestablishment request message is used to reestablish an RRC connection; the receiving unit is configured to receive a reestablishment message from the base station, where the reestablishment message includes a next hop chaining counter NCC and key derivation information; the processing unit is configured to: derive a first access stratum key of the terminal based on the key derivation information; and derive a second access stratum key of the terminal based on the NCC and the first access stratum key of the terminal; and the sending unit is further configured to send a reestablishment complete message to the base station, where the reestablishment complete message is protected by using a key derived based on the second access stratum key of the terminal.

In a possible implementation, the key derivation information includes a first indication and a non-access stratum container NASC, the NASC includes a second indication and a downlink NAS COUNT indication, the first indication is used to indicate to update an access stratum key, and the second indication is used to indicate to update a root key; and the processing unit is specifically configured to: derive a second root key of the terminal based on the second indication, the downlink NAS COUNT indication, and a first root key of the terminal; and derive the first access stratum key of the terminal based on the first indication and the second root key of the terminal.

In a possible implementation, the NASC further includes a first NAS MAC and an identifier of a selected algorithm, and the processing unit is further configured to: derive a non-access stratum key based on the second root key of the terminal; and check the first NAS MAC based on the selected algorithm, the downlink NAS COUNT indication, and the non-access stratum key.

In a possible implementation, the key derivation information includes a first indication, and the first indication is used to indicate to update an access stratum key; and the processing unit is specifically configured to derive the first access stratum key of the terminal based on the first indication and a first root key of the terminal.

In a possible implementation, the downlink NAS COUNT indication includes low L1 bits of a downlink NAS COUNT, and the first NAS MAC includes all bits of a second NAS MAC; and that the terminal checks the first NAS MAC based on the selected algorithm, the downlink NAS COUNT indication, and the non-access stratum key includes: The processing unit is specifically configured to: obtain a second downlink NAS COUNT based on the downlink NAS COUNT indication and a first downlink NAS COUNT of the terminal; generate a NAS MAC based on the non-access stratum key, the selected algorithm, and the second downlink NAS COUNT; and check the first NAS MAC of the NASC based on the generated NAS MAC.

In a possible implementation, the downlink NAS COUNT indication includes low L2 its of a downlink NAS COUNT, and the first NAS MAC includes low L3 bits or high L4 bits of a second NAS MAC; and the processing unit is specifically configured to: obtain a second downlink NAS COUNT based on the downlink NAS COUNT indication and a first downlink NAS COUNT of the terminal; generate a NAS MAC based on the non-access stratum key, the selected algorithm, and the second downlink NAS COUNT; and check the first NAS MAC of the NASC based on low L3 bits or high L4 bits of the generated NAS MAC.

In a possible implementation, the downlink NAS COUNT indication includes all bits of a downlink NAS COUNT, and the first NAS MAC includes low L5 bits of a second NAS MAC; and the processing unit is specifically configured to: generate a NAS MAC based on the non-access stratum key, the selected algorithm, and the downlink NAS COUNT indication of the NASC; and check the first NAS MAC of the NASC based on low L5 bits of the generated NAS MAC.

In a possible implementation, the receiving unit is further configured to: before the sending unit sends the reestablishment request message to the base station, receive an RRC reconfiguration message from the base station, where the RRC reconfiguration message includes a configuration parameter, the NCC, and the key derivation information; and the processing unit is further configured to perform configuration based on the configuration parameter, where the configuration fails.

In a possible implementation, the receiving unit is further configured to: before the sending unit sends the reestablishment request message to the base station, receive an RRC reconfiguration message from the base station, where the RRC reconfiguration message includes the NCC and the key derivation information; the sending unit is further configured to send an RRC reconfiguration complete message to the base station; and the processing unit is further configured to determine that the timer expires.

When the apparatus shown in FIG. 10 is the terminal or the base station, for specific beneficial effects of wireless communication performed by the apparatus, refer to related descriptions in the foregoing method embodiments. Details are not described herein again.

Figure 11:
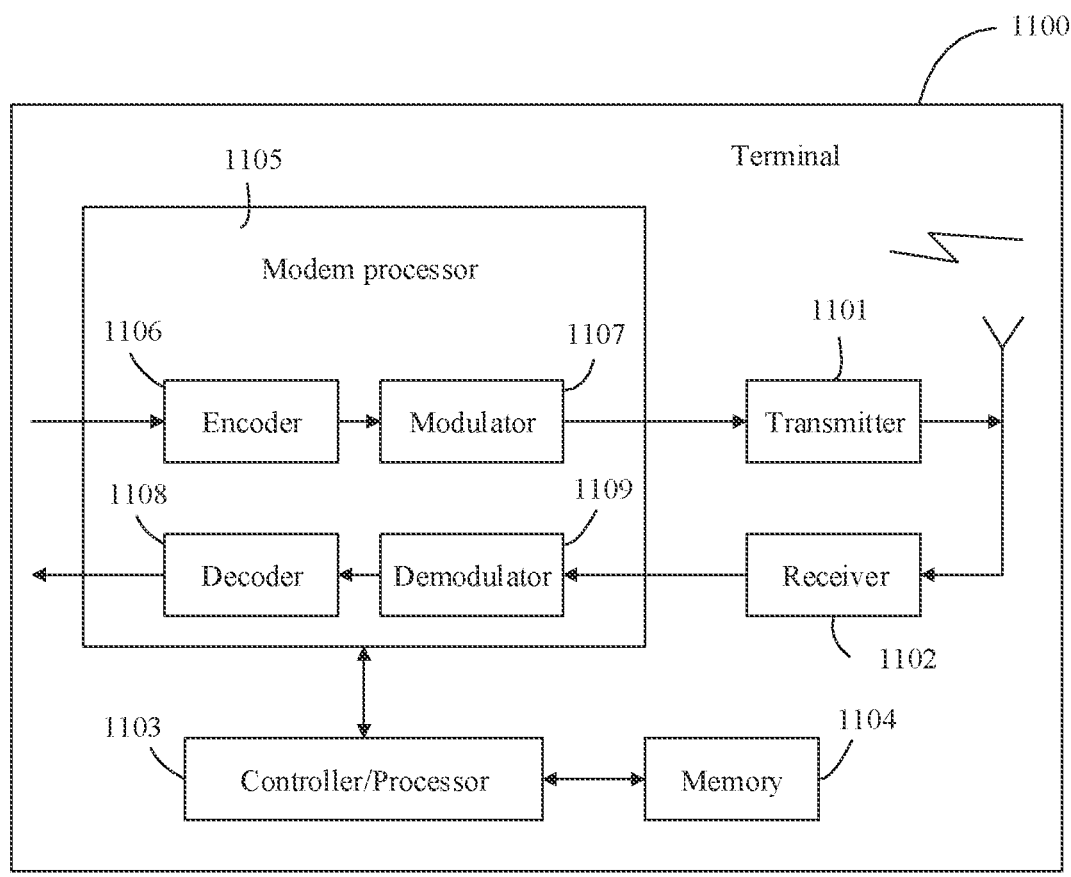
FIG. 11 is a schematic diagram of a terminal according to this application.

FIG. 11 is a simplified schematic diagram of a possible design structure of a terminal in an embodiment of the present invention. The terminal 1100 includes a transmitter 1101, a receiver 1102, and a processor 1103. The processor 1103 may also be a controller, and is represented as a "controller/processor 1103" in FIG. 11. Optionally, the terminal 1100 may further include a modem processor 1105, and the modem processor 1105 may include an encoder 1106, a modulator 1107, a decoder 1108, and a demodulator 1109.

In an example, the transmitter 1101 adjusts (for example, through analog conversion, filtering, amplification, and up-conversion) an output sample and generates an uplink signal. The uplink signal is transmitted to the base station in the foregoing embodiments by using an antenna. On a downlink, the antenna receives a downlink signal transmitted by the base station in the foregoing embodiments. The receiver 1102 adjusts (for example, through filtering, amplification, down-conversion, and digitalization) a signal received from the antenna and provides an input sample. In the modem processor 1105, the encoder 1106 receives service data and a signaling message that are to be sent on an uplink, and processes (for example, through formatting, encoding, and interleaving) the service data and the signaling message. The modulator 1107 further processes (for example, through symbol mapping and modulation) encoded service data and an encoded signaling message, and provides the output sample. The demodulator 1109 processes (for example, through demodulation) the input sample and provides symbol estimation. The decoder 1108 processes (for example, through de-interleaving and decoding) the symbol estimation and provides decoded data and a decoded signaling message that are to be sent to the terminal 1100. The encoder 1106, the modulator 1107, the demodulator 1109, and the decoder 1108 may be implemented by the composite modem processor 1105. These units perform processing based on a radio access technology used in a radio access network. It should be noted that when the terminal 1100 does not include the modem processor 1105, the foregoing functions of the modem processor 1105 may also be implemented by the processor 1103.

The processor 1103 controls and manages an action of the terminal 1100, and is configured to perform a processing process performed by the terminal 1100 in the foregoing embodiments of the present invention. For example, the processor 1103 is configured to perform a processing process of the terminal in the wireless communication method according to any one of the embodiments of this application and/or another process of the technical solutions described in this application.

Further, the terminal 1100 may further include a memory 1104, and the memory 1104 is configured to store program code and data of the terminal 1100.

Figure 12:
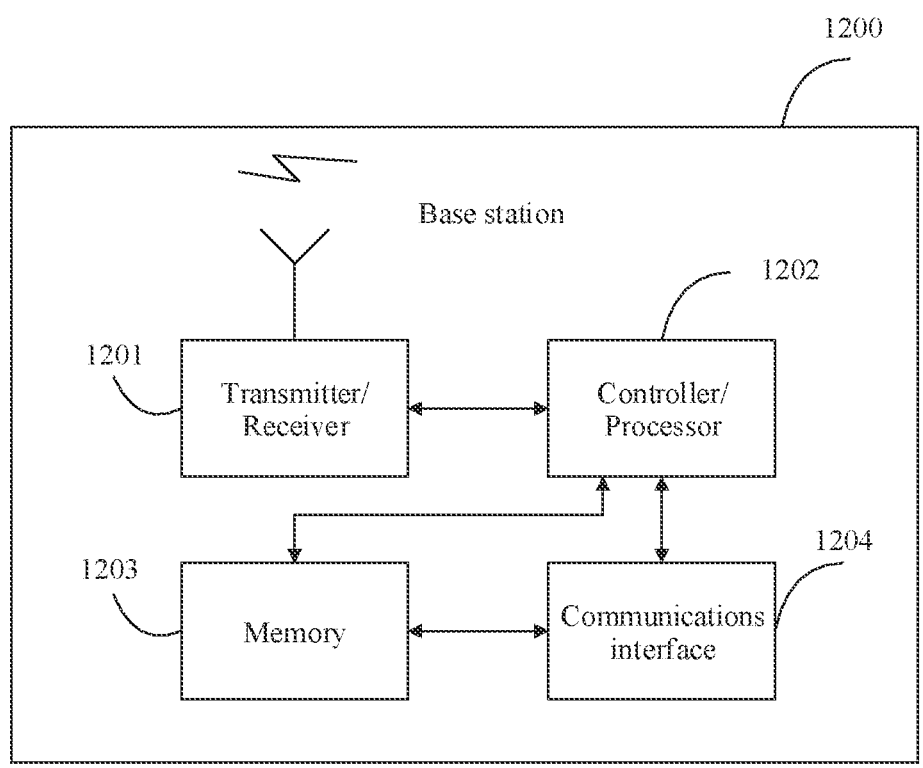
FIG. 12 is a schematic diagram of a base station according to this application.

FIG. 12 is a possible schematic structural diagram of a base station according to an embodiment of the present invention. The base station 1200 includes a processor 1202 and a communications interface 1204. The processor 1202 may also be a controller, and is represented as a "controller/processor 1202" in FIG. 12. The communications interface 1204 is configured to support the base station in communicating with a terminal. Further, the base station 1200 may further include a transmitter/receiver 1201. The transmitter/receiver 1201 is configured to support radio communication between the base station and the terminal in the foregoing embodiments. The processor 1202 may execute various functions used to communicate with the terminal. On an uplink, an uplink signal from the terminal is received by using an antenna, is demodulated (for example, a high frequency signal is demodulated into a baseband signal) by the receiver 1201, and is further processed by the processor 1202 to recover service data and signaling information that are sent by the terminal. On a downlink, service data and a signaling message are processed by the processor 1202, and are modulated (for example, a baseband signal is modulated into a high frequency signal) by the transmitter 1201, to generate a downlink signal, and the downlink signal is transmitted to the terminal by using the antenna. It should be noted that the foregoing demodulation or modulation function may also be implemented by the processor 1202.

For example, the processor 1202 is further configured to perform a processing process related to the base station in the wireless communication method according to any one of the embodiments of this application and/or another process of the technical solutions described in this application.

Further, the base station 1200 may further include a memory 1203, and the memory 1203 is configured to store program code and data of the base station 1200.

It may be understood that FIG. 12 shows only a simplified design of the base station 1200. In actual application, the base station 1200 may include any quantity of transmitters, receivers, processors, controllers, memories, communications units, and the like, and all base stations that can implement the embodiments of the present invention fall within the protection scope of the embodiments of the present invention.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, the procedures or the functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, DVD), a semiconductor medium (for example, a solid-state drive (Solid State Disk, SSD)), or the like.

The various illustrative logical units and circuits described in the embodiments of this application may implement or operate the described functions by using a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may also be implemented by a combination of computing apparatuses, such as a digital signal processor and a microprocessor, a plurality of microprocessors, one or more microprocessors in combination with a digital signal processor core, or any other similar configuration.

Steps of the methods or algorithms described in the embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may be connected to a processor, so that the processor may read information from the storage medium and write information to the storage medium. Optionally, the storage medium may further be integrated into the processor. The processor and the storage medium may be disposed in an ASIC, and the ASIC may be disposed in the terminal. Optionally, the processor and the storage medium may also be disposed in different components of the terminal.

The computer program instructions may alternatively be loaded onto the computer or another programmable data processing device, so that a series of operations and steps are performed on the computer or the another programmable device, to generate computer-implemented processing. Therefore, the instructions executed on the computer or the another programmable device provide steps for implementing a specific function in one or more procedures in the flowcharts and/or in one or more blocks in the block diagrams.

Although this application is described with reference to specific features and the embodiments thereof, it is clear that various modifications and combinations may be made to them without departing from the scope of this application.

Correspondingly, the specification and the accompanying drawings are merely example descriptions of this application defined by the appended claims, and are intended to cover any of or all modifications, variations, combinations, or equivalents within the scope of this application. It is clear that a person skilled in the art can make various modifications and variations to this application without departing from the scope of this application. This application is intended to cover these modifications and variations of this application provided that they fall within the scope of the claims of this application and their equivalent technologies.

What is claimed is:

1. A wireless communication method, the method comprising:
sending, by a terminal, a reestablishment request message to a base station, wherein the reestablishment request message is used to reestablish a radio resource control (RRC) connection;
receiving, by the terminal, a reestablishment message from the base station, wherein the reestablishment message comprises a next hop chaining counter (NCC) and key derivation information, wherein the key derivation information comprises a first indication and a non-access stratum container (NASC), wherein the first indication comprises a first flag indicating whether an access stratum key is to be updated, wherein the NASC comprises a second indication and a downlink non-access stratum (NAS) COUNT indication, wherein the second indication comprises a second flag indicating whether a root key is to be updated, and wherein the NASC further comprises a first NAS media access control (MAC) and an identifier of a selected algorithm, the downlink NAS COUNT indication comprises low L1 bits of a downlink NAS COUNT, the first NAS MAC comprises all bits of a second NAS MAC, and L1 is a positive integer;
deriving, by the terminal, a second root key of the terminal based on the second indication, the downlink NAS COUNT indication, and a first root key of the terminal; and
deriving, by the terminal, a first access stratum key of the terminal based on the first indication and the second root key of the terminal;
deriving, by the terminal, a second access stratum key of the terminal based on the NCC and the first access stratum key of the terminal;
sending, by the terminal, a reestablishment complete message to the base station, wherein the reestablishment complete message is protected by using a key derived based on the second access stratum key of the terminal;
deriving, by the terminal, a non-access stratum key based on the second root key of the terminal;
obtaining, by the terminal, a second downlink NAS COUNT based on the downlink NAS COUNT indication and a first downlink NAS COUNT of the terminal;
generating, by the terminal, a NAS MAC based on the non-access stratum key, the selected algorithm, and the second downlink NAS COUNT; and
checking, by the terminal, the first NAS MAC of the NASC based on the generated NAS MAC.

2. The method according to claim 1, wherein before the sending, by the terminal, a reestablishment request message to a base station, the method further comprises:
receiving, by the terminal, a RRC reconfiguration message from the base station, wherein the RRC reconfiguration message comprises a configuration parameter, the NCC, and the key derivation information; and
performing, by the terminal, configuration based on the configuration parameter, wherein the configuration fails.

3. The method according to claim 1, wherein before the sending, by the terminal, a reestablishment request message to a base station, the method further comprises:
receiving, by the terminal, an RRC reconfiguration message from the base station, wherein the RRC reconfiguration message comprises the NCC and the key derivation information;
starting, by the terminal, a timer;
sending, by the terminal, an RRC reconfiguration complete message to the base station; and
determining, by the terminal, that the timer expires.

4. A wireless communication method, the method comprising:
receiving, by a base station, a reestablishment request message from a terminal, wherein the reestablishment request message is used to reestablish a radio resource control (RRC) connection;
determining, by the base station, a first indication based on a buffered intermediate parameter, wherein the buffered intermediate parameter is a new security context indicator (NSCI) obtained by the base station from an access and mobility management function entity in a handover preparation process, and wherein the NSCI is used to indicate the base station to update an access stratum key;
sending, by the base station, a reestablishment message to the terminal, wherein the reestablishment message comprises a next hop chaining counter (NCC) and key derivation information, wherein the key derivation information is used to indicate the terminal to derive the access stratum key, wherein the key derivation information comprises the first indication and a non-access stratum container (NASC), wherein the first indication comprises a first flag indicating whether the access stratum key is to be updated, wherein the NASC comprises a second indication and a downlink non-access stratum (NAS) COUNT indication, and wherein the second indication comprises a second flag indicating whether a root key is to be updated; and
receiving, by the base station, a reestablishment complete message from the terminal, wherein the reestablishment complete message is protected by using a key derived based on the access stratum key.

5. The method according to claim 4, wherein before the receiving, by a base station, a reestablishment request message from the terminal, the method further comprises:
obtaining, by the base station, a NSCI from an access and mobility management function entity in a handover preparation process, wherein the NSCI is used to indicate the base station to update the access stratum key; and
determining and storing, by the base station, the first indication based on the NSCI; and
wherein before the sending, by the base station, a reestablishment message to the terminal, the method further comprises:
obtaining, by the base station, the stored first indication.

6. The method according to claim 4, wherein before the receiving, by a base station, a reestablishment request message from the terminal, the method further comprises:

obtaining and storing, by the base station, the NASC from an access and mobility management function entity in a handover preparation process; and wherein before the sending, by the base station, a reestablishment message to the terminal, the method further comprises:

obtaining, by the base station, the stored NASC.

7. The method according to claim 4, wherein before the receiving, by a base station, a reestablishment request message from the terminal, the method further comprises:

sending, by the base station, an RRC reconfiguration message to the terminal, wherein the RRC reconfiguration message comprises a configuration parameter, the NCC, and the key derivation information.

8. An apparatus used in a terminal, the apparatus comprising:

at least one processor; and one or more memories coupled to the at least one processor and storing program instructions for execution by the at least one processor to:

send a reestablishment request message to a base station, wherein the reestablishment request message is used to reestablish a radio resource control (RRC) connection;

receive a reestablishment message from the base station, wherein the reestablishment message comprises a next hop chaining counter (NCC) and key derivation information, wherein the key derivation information comprises a first indication and a non-access stratum container (NASC), wherein the first indication comprises a first flag indicating whether an access stratum key is to be updated, wherein the NASC comprises a second indication and a downlink non-access stratum (NAS) COUNT indication, wherein the second indication comprises a second flag indicating whether a root key is to be updated, and wherein the NASC further comprises a first NAS media access control (MAC) and an identifier of a selected algorithm, the downlink NAS COUNT indication comprises low L1 bits of a downlink NAS COUNT, the first NAS MAC comprises all bits of a second NAS MAC, and L1 is a positive integer;

derive a second root key of the terminal based on the second indication, the downlink NAS COUNT indication, and a first root key of the terminal; and derive a first access stratum key of the terminal based on the first indication and the second root key of the terminal;

derive a second access stratum key of the terminal based on the NCC and the first access stratum key of the terminal;

send a reestablishment complete message to the base station, wherein the reestablishment complete message is protected by using a key derived based on the second access stratum key of the terminal;

derive a non-access stratum key based on the second root key of the terminal;

obtain a second downlink NAS COUNT based on the downlink NAS COUNT indication and a first downlink NAS COUNT of the terminal;

generate a NAS MAC based on the non-access stratum key, the selected algorithm, and the second downlink NAS COUNT; and check the first NAS MAC of the NASC based on the generated NAS MAC.

9. The apparatus according to claim 8, wherein the one or more memories store the program instructions for execution by the at least one processor further to:

receive an RRC reconfiguration message from the base station before sending the reestablishment request message to the base station, wherein the RRC reconfiguration message comprises a configuration parameter, the NCC, and the key derivation information; and perform configuration based on the configuration parameter, wherein the configuration fails.

* * * * *